US009158762B2

(12) United States Patent
Standingdeer, Jr. et al.

(10) Patent No.: US 9,158,762 B2
(45) Date of Patent: Oct. 13, 2015

(54) DECONSTRUCTION AND CONSTRUCTION OF WORDS OF A POLYSYNTHETIC LANGUAGE FOR TRANSLATION PURPOSES

(71) Applicants: John C. Standingdeer, Jr., Whittier, NC (US); Barbara R. Duncan, Whittier, NC (US); Susan A. Reimensnyder, Davenport, IA (US)

(72) Inventors: John C. Standingdeer, Jr., Whittier, NC (US); Barbara R. Duncan, Whittier, NC (US); Susan A. Reimensnyder, Davenport, IA (US)

(73) Assignee: Flying Lizard Languages, LLC, Asheville, NC (US)

( * ) Notice: Subject to any disclaimer, the term of this patent is extended or adjusted under 35 U.S.C. 154(b) by 249 days.

(21) Appl. No.: 13/768,686

(22) Filed: Feb. 15, 2013

(65) Prior Publication Data
US 2013/0218552 A1    Aug. 22, 2013

Related U.S. Application Data

(60) Provisional application No. 61/599,620, filed on Feb. 16, 2012.

(51) Int. Cl.
*G06F 17/28*    (2006.01)
*G06F 17/27*    (2006.01)

(52) U.S. Cl.
CPC ............ *G06F 17/289* (2013.01); *G06F 17/271* (2013.01)

(58) Field of Classification Search
USPC ...................................... 704/1–10
See application file for complete search history.

(56) References Cited

U.S. PATENT DOCUMENTS

| 4,852,003 | A | 7/1989 | Zamora |
| 5,432,948 | A | 7/1995 | Davis et al. |
| 5,490,061 | A | 2/1996 | Tolin et al. |
| 5,878,385 | A * | 3/1999 | Bralich et al. .................... 704/9 |
| 6,178,397 | B1 | 1/2001 | Fredenburg |
| 7,104,798 | B2 | 9/2006 | Spaventa |
| 7,149,690 | B2 | 12/2006 | August et al. |
| 7,153,139 | B2 | 12/2006 | Wen et al. |
| 7,165,972 | B1 | 1/2007 | Jones |
| 7,167,822 | B2 | 1/2007 | Ueda |
| 7,177,794 | B2 | 2/2007 | Mani et al. |
| 7,296,260 | B2 | 11/2007 | Wen et al. |
| 7,542,908 | B2 | 6/2009 | Segond et al. |
| 7,680,646 | B2 | 3/2010 | Lux-Pogodalla et al. |
| 8,150,677 | B2 | 4/2012 | Menezes et al. |

(Continued)

OTHER PUBLICATIONS

International Search Report mailed Apr. 26, 2013 in corresponding International Application PCT/US13/26423.

*Primary Examiner* — Barbara Reinier
(74) *Attorney, Agent, or Firm* — Luedeka Neely Group, P.C.

(57) ABSTRACT

For facilitating subsequent translation of words in a target polysynthetic language (e.g. Cherokee) to or from a user language (e.g. English), a method of generating a language parsing reference database, assisted by a computer having a processor, including the steps of organizing the parsing reference database to include polysynthetic word parts WHO is doing an action, WHAT action is being done, HOW an action is happening and WHEN an action is happening. In one embodiment an internet website hosted on a computer server is established, the website being accessible to users via the internet. The computer server runs or executes server side software referencing the parsing reference database, and is operable to translate a word in the target polysynthetic language to the user language, or to construct a word in the target polysynthetic language from a sentence in a user language.

3 Claims, 17 Drawing Sheets

(56) References Cited

U.S. PATENT DOCUMENTS

| | | |
|---|---|---|
| 8,249,854 B2 | 8/2012 | Nikitin et al. |
| 8,265,924 B1 | 9/2012 | Cutler |
| 8,285,536 B1 | 10/2012 | Kumar et al. |
| 8,327,265 B1 | 12/2012 | Vogel |
| 2002/0198713 A1 | 12/2002 | Franz et al. |
| 2007/0294076 A1* | 12/2007 | Shore et al. ............ 704/2 |
| 2010/0179803 A1 | 7/2010 | Sawaf et al. |
| 2011/0137636 A1 | 6/2011 | Srihari et al. |

* cited by examiner

CONSTRUCT ONE CHEROKEE WORD

1. WHAT [GO ⇕]

2. YES OR NO   ○ YES, GOING   ○ NO, NOT GOING

3. WHO:
○ I
○ YOU AND I
○ WE ALL
○ S/HE AND I
○ THEY AND I
○ YOU (ONE)
○ YOU (TWO)
○ YOU ALL
○ S/HE IT
○ THEY

4. WHEN:
○ PRESENT
○ IMMEDIATE PAST OR IMMEDIATE FUTURE
○ PRESENT - CONTINUALLY/HABITUALLY
○ FUTURE - CONTINUALLY/HABITUALLY
○ PAST - CONTINUALLY/HABITUALLY
○ PAST - CONTINUALLY/HABITUALLY - IT DEFINITELY HAPPENED
○ PAST - CONTINUALLY/HABITUALLY - IT REPORTEDLY HAPPENED
○ FUTURE - ONE POINT IN TIME
○ PAST - ONE POINT IN TIME
○ PAST - ONE POINT IN TIME - DEFINITELY
○ PAST - ONE POINT IN TIME - REPORTEDLY
○ INFINITIVE - TO DO IT (SUBMIT)

*FIG. 6*

MAKE ONE CHEROKEE WORD-SENTENCE

1. WHAT (ROOT WORD) [ HIT ⇵ ]
2. YES OR NO  ○ YES, THE ACTION IS HAPPENING  ○ NO, THE ACTION IS NOT HAPPENING
3. WHO:       TO WHOM:       4. WHEN:

THIS IS A CHEROKEE VERB THAT REQUIRES YOU TO SPECIFY TO WHOM THE ACTION IS BEING DONE. FOR EXAMPLE "I AM HITTING YOU (3+)." OR "YOU (1) LOVE HIM."

| | | |
|---|---|---|
| ○ I | ○ ME | ○ PRESENT |
| ○ YOU (1) AND I | ○ YOU (1) AND ME | ○ IMMEDIATE PAST OR IMMEDIATE FUTURE |
| ○ YOU ALL AND I | ○ ALL OF YOU AND ME | ○ PRESENT - CONTINUALLY/HABITUALLY |
| ○ S/HE AND I | ○ HIM OR HER AND ME | ○ FUTURE - CONTINUALLY/HABITUALLY |
| ○ THEY AND I | ○ THEY AND ME | ○ PAST - CONTINUALLY/HABITUALLY |
| ○ YOU (1) | ○ YOU (1) | ○ PAST - CONTINUALLY/HABITUALLY - IT DEFINITELY HAPPENED |
| ○ YOU (2) | ○ YOU (2) | ○ PAST - CONTINUALLY/HABITUALLY - IT REPORTEDLY HAPPENED |
| ○ YOU (3+) | ○ YOU (3+) | ○ FUTURE - ONE POINT IN TIME |
| ○ S/HE OR IT | ○ HIM OR HER | ○ PAST - ONE POINT IN TIME |
| | ○ IT | ○ PAST - ONE POINT IN TIME - DEFINITELY |
| ○ THEY (ALIVE) | ○ THEM (ALIVE) | ○ PAST - ONE POINT IN TIME - REPORTEDLY |
| ○ THEY (NOT ALIVE) | ○ THEM (NOT ALIVE) | ○ FUTURE POSSIBLE - TO DO IT |

( SUBMIT )

*FIG. 7*

MAKE ONE CHEROKEE WORD-SENTENCE

1. WHAT (ROOT WORD) [HIT ⇅]
2. YES OR NO  ○ YES, THE ACTION IS HAPPENING  ○ NO, THE ACTION IS NOT HAPPENING
3. WHO:        TO WHOM:        4. WHEN:
THIS IS A CHEROKEE VERB THAT REQUIRES YOU TO SPECIFY TO WHOM THE ACTION IS BEING DONE. FOR EXAMPLE "I AM HITTING YOU (3+)." OR "YOU (1) LOVE HIM."

⦿ I                              ○ PRESENT
○ YOU (1) AND I                  ○ IMMEDIATE PAST OR IMMEDIATE FUTURE
○ YOU ALL AND I                  ○ PRESENT - CONTINUALLY/HABITUALLY
○ S/HE AND I                     ○ FUTURE - CONTINUALLY/HABITUALLY
○ THEY AND I                     ○ PAST - CONTINUALLY/HABITUALLY
○ YOU (1)    ○ YOU (1)           ○ PAST - CONTINUALLY/HABITUALLY - IT DEFINITELY HAPPENED
○ YOU (2)    ○ YOU (2)           ○ PAST - CONTINUALLY/HABITUALLY - IT REPORTEDLY HAPPENED
○ YOU (3+)   ○ YOU (3+)          ○ FUTURE - ONE POINT IN TIME
○ S/HE OR IT ○ HIM OR HER        ○ PAST - ONE POINT IN TIME
             ○ IT                ○ PAST - ONE POINT IN TIME - DEFINITELY
○ THEY (ALIVE) ○ THEM (ALIVE)    ○ PAST - ONE POINT IN TIME - REPORTEDLY
○ THEY (NOT ALIVE) ○ THEM (NOT ALIVE)  ○ FUTURE POSSIBLE - TO DO IT (SUBMIT)

FIG. 8

MAKE ONE CHEROKEE WORD-SENTENCE

1. WHAT (ROOT WORD) [ HIT ⇕ ]
2. YES OR NO  ○ YES, THE ACTION IS HAPPENING   ○ NO, THE ACTION IS NOT HAPPENING
3. WHO:          TO WHOM:          4. WHEN:
THIS IS A CHEROKEE VERB THAT REQUIRES YOU TO SPECIFY TO WHOM THE ACTION IS BEING DONE. FOR EXAMPLE "I AM HITTING YOU (3+)." OR "YOU (1) LOVE HIM."

| | | |
|---|---|---|
| ○ I | ○ ME | ○ PRESENT |
| ○ YOU (1) AND I | ○ YOU (1) AND ME | ○ IMMEDIATE PAST OR IMMEDIATE FUTURE |
| ○ YOU ALL AND I | ○ ALL OF YOU AND ME | ○ PRESENT - CONTINUALLY/HABITUALLY |
| ○ S/HE AND I | ○ HIM OR HER AND ME | ○ FUTURE - CONTINUALLY/HABITUALLY |
| ○ THEY AND I | ○ THEY AND ME | ○ PAST - CONTINUALLY/HABITUALLY |
| ○ YOU (1) | ○ YOU (1) | ○ PAST - CONTINUALLY/HABITUALLY - IT DEFINITELY HAPPENED |
| ○ YOU (2) | ○ YOU (2) | ○ PAST - CONTINUALLY/HABITUALLY - IT REPORTEDLY HAPPENED |
| ○ YOU (3+) | ○ YOU (3+) | ○ FUTURE - ONE POINT IN TIME |
| ⊙ S/HE OR IT | ○ HIM OR HER | ○ PAST - ONE POINT IN TIME |
| | ○ IT | ○ PAST - ONE POINT IN TIME - DEFINITELY |
| ○ THEY (ALIVE) | ○ THEM (ALIVE) | ○ PAST - ONE POINT IN TIME - REPORTEDLY |
| ○ THEY (NOT ALIVE) | ○ THEM (NOT ALIVE) | ○ FUTURE POSSIBLE - TO DO IT |

( SUBMIT )

FIG. 10

DECONSTRUCTION AND CONSTRUCTION OF WORDS OF A POLYSYNTHETIC LANGUAGE FOR TRANSLATION PURPOSES

CROSS-REFERENCE TO RELATED APPLICATION

The benefit of U.S. provisional patent application Ser. No. 61/599,620, filed Feb. 16, 2012 is claimed, the entire disclosure of which is hereby expressly incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention relates generally to language translation and, more particularly, to deconstruction and construction of words of a polysynthetic language. By way of example and not limitation, the invention is disclosed herein in the context of the Cherokee language.

SUMMARY OF THE INVENTION

In one aspect, for facilitating subsequent translation of words in a target polysynthetic language to or from a user language, the invention is embodied in a method of generating a language parsing reference database, assisted by a computer having a processor. The method includes the steps of organizing the parsing reference database to include polysynthetic word parts WHO is doing an action, WHAT action is being done, HOW an action is happening and WHEN an action is happening; finding exemplars of polysynthetic words of the target polysynthetic language expressed in a selected system of orthography; and providing as input to a deconstructor, as exemplars, a plurality of words in the polysynthetic language, employing the deconstructor to determine a character string common to the plurality of polysynthetic words as a likely character string in the target polysynthetic language for WHO, WHAT, HOW and WHEN in the user language, and storing the character string in the target polysynthetic language with the user language equivalent as a pair in the parsing reference database.

In another aspect, for facilitating subsequent translation of words in a target polysynthetic language to or from a user language, the invention is embodied in a method of generating a language parsing reference database, assisted by a computer having a processor. The method includes the steps of organizing the parsing reference database to include polysynthetic word parts WHO is doing an action, WHAT action is being done, HOW an action is happening and WHEN an action is happening; and finding exemplars of polysynthetic words of the target polysynthetic language expressed in a selected system of orthography. The method includes the further steps of providing as input to a deconstructor, as exemplars, a plurality of words in the polysynthetic language where WHO is doing an action is known in the user language, employing the deconstructor to determine a character string common to the plurality of polysynthetic words as a likely character string in the target polysynthetic language for the known WHO in the user language, and storing the character string in the target polysynthetic language with the user language equivalent as a pair in the WHO part of the parsing reference database. The method includes the still further steps of identifying, in the target polysynthetic language, categories of WHEN an action is happening; and, for each of the categories of WHEN, finding, as exemplars, a plurality of words in the polysynthetic language, providing, as input to the deconstructor, the plurality of words in the polysynthetic language along with respective equivalents in the user language, and employing the deconstructor to determine a character string common to the plurality of polysynthetic words as a likely character string in the target polysynthetic language for the particular category of WHEN, and storing the character string in the target polysynthetic language with the user language equivalent as a pair in the WHEN part of the parsing reference database. The method includes the still further steps of identifying, in the target polysynthetic language, category sets of HOW an action is happening combined with WHEN the action is happening as WHEN/HOW category sets; and for each WHEN/HOW category set, finding, as exemplars, a plurality of words in the polysynthetic language, providing, as input to the deconstructor, the plurality of words in the polysynthetic language along with respective equivalents in the user language, and employing the deconstructor to determine a character string common to the plurality of polysynthetic words as a likely character string in the target polysynthetic language for the particular WHEN/HOW category set, presenting to a user for confirmation, storing the character string in the target polysynthetic language with the user language equivalent as a paired sequence, and then subtracting the previously-identified WHEN for the category to determine HOW for that category of WHEN/HOW, and storing in the parsing reference database. Finally, the method includes the steps of determining additional components in the target polysynthetic language other than a WHAT action is being done component, removing those additional components from a polysynthetic word to find WHAT action is being done, and then storing the resultant character string with its user language equivalent as a pair in the parsing reference database.

In yet another aspect, the invention is embodied in a system including a computer processor for translating a word in a target polysynthetic language to a user language. The system includes a parser which references a language parsing reference database, either by instructions coded into a computer program or by access to a separate database, the parsing reference database organized to include polysynthetic word parts WHO is doing an action, WHAT action is being done, HOW an action is happening, and WHEN an action is happening in the polysynthetic language. The parser is operable to separate the word into component parts including word parts WHO, WHAT, HOW and WHEN, and to provide an output in the user language.

In yet another aspect, the invention is embodied in a system including a computer processor for constructing a word in a target polysynthetic language from a sentence in a user language. The system includes a constructor which references a language parsing reference database, either by instructions coded into a computer program or by access to a separate database, the parsing reference database organized to include polysynthetic word parts WHO is doing an action, WHAT action is being done, HOW an action is happening, and WHEN an action is happening in the polysynthetic language. The constructor is operable to accept user input in the user language specifying WHO, WHAT, and HOW/WHEN and to construct and output a translated word in the target polysynthetic language.

In yet another aspect, the invention is embodied in a system including a computer processor for constructing all forms of a given root word in a target polysynthetic language. The system includes a constructor which references a language parsing reference database, either by instructions coded into a computer program or by access to a separate database, the parsing reference database organized to include polysynthetic word parts WHO is doing an action, WHAT action is being done, HOW an action is happening, and WHEN an action is happening in the polysynthetic language. The constructor is operable to accept user input in the user language specifying WHAT action is being done, and to construct and output a list of translated words in the target polysynthetic language including forms for each of the WHO is doing the action for each of the HOW/WHEN the action is being done combinations.

In yet another aspect, the invention is embodied in a system including a computer processor for grouping or clustering all words in a target polysynthetic language having the same text strings in the WHO, HOW and WHEN. The system includes a comparator which references a language parsing reference database, either by instructions coded into a computer program or by access to a separate database, the parsing database organized to include polysynthetic words parts WHO is doing an action, WHAT action is being performed, HOW an action is happening, and WHEN an action is happening in the polysynthetic language. The comparator is operable to sort the contents of the language parsing reference database into like groups, each group containing polysynthetic words having exactly the same text strings for WHO, HOW and WHEN, and to provide an output of these groups showing the Verb Clans conjugation patterns of the target polysynthetic language. The Verb Clans conjugation patterns are stored in a database, or coded into a computer program, or displayed visually as a chart. The system further includes a parser which references the Verb Clans conjugation patterns, either by instructions coded into a computer program or by access to a separate database. The parser is operable to match a polysynthetic word to its corresponding Verb Clan conjugation pattern thereby providing the correct text strings for constructing every form for each of the WHO is doing the action for each of the HOW/WHEN the action is being done combinations.

In still another aspect, the invention is embodied in a computer implemented method for translating words in a target polysynthetic language to or from a user language. The method included the steps of establishing an internet website hosted on a computer server, the website being accessible to users via the internet. The computer server runs or executes server-side software referencing a language parsing reference database, either by instructions coded into the server-side software or by access to a separate database, the parsing reference database organized to include polysynthetic word parts WHO is doing an action, WHAT action is being done, HOW an action is happening, and WHEN an action is happening in the polysynthetic language. The computer server additionally runs or executes server-side software operable to translate a word in the target polysynthetic language to the user language, employing a parser which references the language parsing reference database to separate the word into component parts including word parts WHO, WHAT, HOW and WHEN and to deliver an output in the user language to the user; or to construct a word in the target polysynthetic language from a sentence in a user language employing a constructor which references the language parsing reference database and operable to accept user input in the user language specifying WHO, WHAT, HOW, and WHEN and to construct and output to the user a translated word in the target polysynthetic language.

BRIEF DESCRIPTION OF THE DRAWINGS

FIG. 6 is a screen shot illustrating an end-user input form presented via an internet website running server-side software;

FIG. 7 is another screen shot illustrating an end-user input form presented via an internet website running server-side software;

FIG. 8 is yet another screen shot illustrating an end-user input form presented via an internet website running server-side software;

FIG. 10 is yet another screen shot illustrating an end-user input form presented via an internet website running server-side software;

DETAILED DESCRIPTION

Figure 1A:
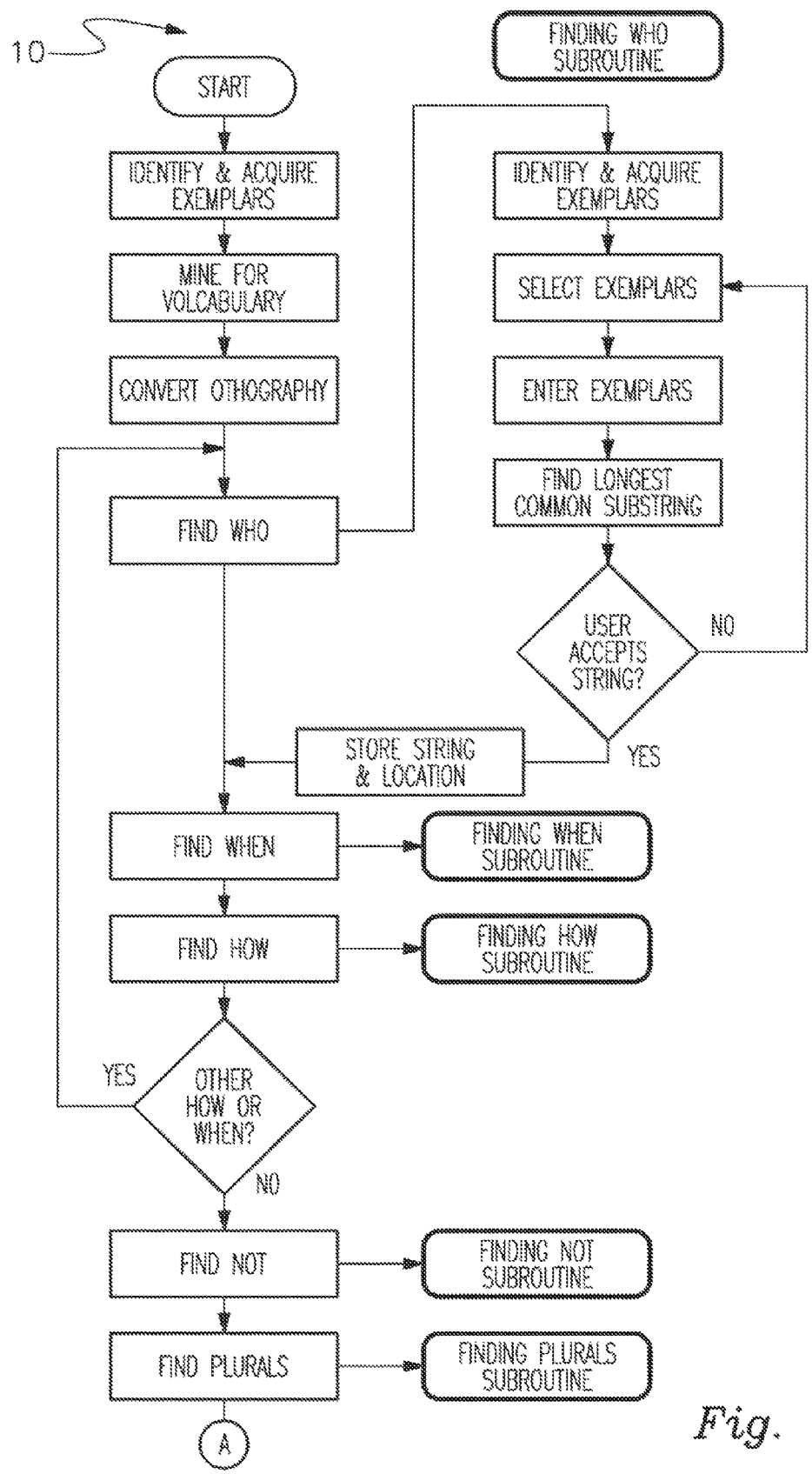
FIGS. 1A and 1B together are a flowchart representing a "deconstructor" for deconstructing a polysynthetic language to generate a language parsing reference database, herein referred to as a "Grandmother Chart;" as well as a database of what are herein referred to as "Verb Clans;"

In what is commonly called a polysynthetic language (Cherokee, as an example, but not as a limitation), a single word is equivalent to an entire sentence in the user language (English, as an example, but not as a limitation). In overview, embodiments of the invention are based on a method and system for analyzing units of meaning in what are commonly called polysynthetic languages in order to discern an underlying algorithm, which is not consciously known even by native speakers. The underlying algorithm is expressed in a language parsing reference database, herein referred to as or termed a "Grandmother Chart." The parsing reference database can be used to translate words in the target polysynthetic language to the user language (in what may be viewed as a deconstruction process, but not the same deconstruction process used to initially generate the parsing reference database), or to translate words from the user language to the target polysynthetic language (in what may be viewed as a reconstruction process). The parsing reference database or "Grandmother Chart" may conceptually be organized as columns where each column has or contains a finite number of possibilities for a particular part of a polysynthetic word based on the patterns of the target language. Embodiments of the invention additionally implement a system for classifying verbs and predicting their conjugations based on the last three letters of the present tense and, as needed, additional letters proceeding to the left.

The invention is based on an analysis of a polysynthetic language (herein Cherokee, as an example), recognizing patterns in parts or portions of words. The parts are organized as WHO, WHAT, HOW and WHEN, conveniently or conceptually notated as columns in the parsing reference database or "Grandmother Chart." Significant is where, exactly, a polysynthetic word in the Cherokee language is broken apart or separated into its constituent parts or portions, in other words, where each part begins and ends. This analysis, as expressed in the parsing reference database or "Grandmother Chart," facilitates the construction and deconstruction of all words in the language employing an algorithm, which can be implemented in computer software.

More particularly, in the WHO column of the "Grandmother Chart" is a set of prefixes that indicate WHO is doing the action or WHO is doing the action to WHOM, based on an analysis of the patterns in the Cherokee language. (Other polysynthetic languages have the same underlying structure as Cherokee, although components may be in a different order, and have been characterized by scholars in the same categories of active, stative, and transitive.)

In the WHAT column is the verb root portion, the beginning and ending of which is based on having extremely consistent word parts in the WHO and HOW columns. In addition, the verb root is consistent throughout all tenses of any given word. Within the verb root, there is no differentiation of syllables that indicate reflexivity, repetition, reversiveness, or the classificatory states of liquid, solid, flexible, rigid, or alive.

Also significant is that the analysis differentiates between the suffixes HOW and WHEN. Separation of these two parts of the word reflects an inherent pattern in the language, which is extremely consistent throughout Cherokee and in other polysynthetic languages.

In the HOW column (which other scholars might call the aspect suffix), the polysynthetic word is divided according to the inherent patterns of the language, keeping the verb stem consistent throughout all tenses, and keeping the WHEN column consistent.

In the WHEN column (which other scholars might call the modal suffix), the polysynthetic word and the HOW column are divided so that the suffixes in the WHEN column are consistent for all words in the Cherokee language.

The method of analysis disclosed herein, and the resulting Grandmother Chart, allow all verbs to be classified into categories, which are herein termed "VERB CLANS." The VERB CLANS accurately and consistently predict the HOW and WHEN suffixes for all the verbs within a category.

As indicated above, the parsing reference database or "Grandmother Chart" can be used to deconstruct and reconstruct words in the target language. Also as indicated above, various aspects of the invention are embodied in computer software.

Figure 1B:
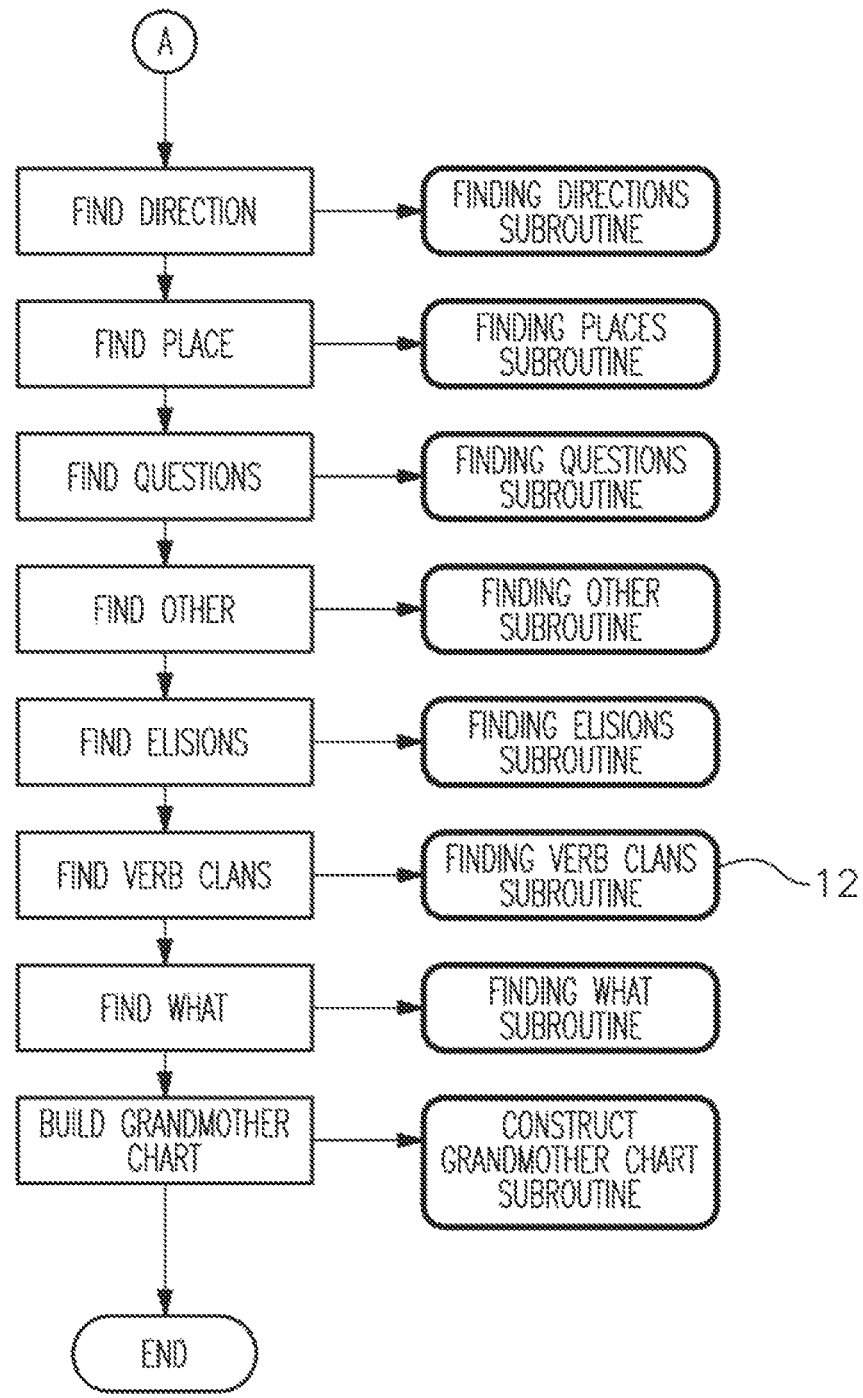

"Deconstructor" to Generate a "Grandmother Chart" FIGS. 1A and 1B together are a flowchart representing a "deconstructor" 10 for deconstructing a polysynthetic language to generate a parsing reference database or what is herein also termed a "Grandmother Chart," as well as "Verb Clans." In overview, during execution, the deconstructor 10 analyzes polysynthetic words from the polysynthetic language and identifies character strings that make up component parts.

More particularly, the deconstructor 10 takes exemplars from a language and iteratively parses them to identify the component parts. A user enters a certain number of polysynthetic words where the WHO is known in English (For example, I am running, I am speaking, I am wishing, etc). The deconstructor identifies the sequence common to all the words that is equivalent to "I" in English. Sequential iterations do the same for each component part of the word (WHO, WHAT, HOW, WHEN, prefixes and suffixes), until all the possibilities for each column have been identified.

Once the component possibilities have been identified (the parsing reference database or Grandmother Chart), then that data is sorted to create the Verb Clans (sets of words that conjugate in the same way). Then the parsing reference database or Grandmother Chart and Verb Clans are used as input to create the Construct One, Construct All, Construct Who to Whom and Deconstructor for that language.

In the specific example of FIGS. 1A and 1B, the deconstructor 10 is embodied in a program which has all the instructions coded into, and outputs stored in the program itself. As an alternative, the deconstructor may be embodied in a program (not shown) which accesses a database to store the appropriate letters or syllables for each individual position.

Details of "Deconstructor"

©2012 Flying Lizard Languages

A Deconstructor for an unknown polysynthetic language identifies the inherent patterns in the language in order to create a parsing reference database or Grandmother chart for that language. The parsing reference database is then used to parse a word in the polysynthetic language, and for Construct One word or Construct All processes to construct or deconstruct any word in the target polysynthetic language. Again, examples are from Cherokee. However, embodiments of the invention are not limited to Cherokee.

The overall result of the deconstructor is the transformation of the polysynthetic words into a parsing reference database (which may be represented as a chart) holding all the text string options (polysynthetic word parts) for all the words in all of the positions, along with the necessary organizational structure and labels. The resulting parsing reference database can then be used to transform individual text strings back into correctly formed polysynthetic words 1. Identifying and Acquiring Exemplars Initially, any published word lists or grammars for the target language are identified and acquired as exemplars.

Preferred source is from the Bureau of American Ethnology from the 1880s to 1960s. At that time the Bureau of Ethnology sent linguists out to the tribes with standardized notebooks of vocabulary words to collect. Each linguist was taught a standard orthography to use to capture the sounds (although many of them made personal changes to that orthography). These are now available in libraries, as used books, and in some cases as reprints.

The earliest linguistic studies of native American languages (1666-1850s) were often from missionaries who tried to learn the languages in order to preach the Gospel and translate the Bible into the native languages. Many of the missionaries were trained in Latin and Greek and so they published lists of verb conjugations in the native languages, based on their training. These lists are not standardized but can provide some excellent data. Many early linguistic works are available in the American Language Reprint Series.

From 1900-1940 there was another wave of scholars studying the native languages, beginning with the anthropology students of Franz Boas at Columbia University. Beginning in the 1970's to the present applied anthropologists studied native languages either to help acculturate tribes or preserve tradition. They produced dissertations that can be useful in providing vocabulary.

Interest in saving these endangered languages accelerated with the passage of the Native American Languages Acts of 1990 and 1992, which recognized that these languages are endangered, and provides funding to support research. Use the WorldCat catalog at http://www.worldcat.org to search on "tribe name language" as a subject to find the authors who worked with a specific language. Then acquire as many of these as possible.

Since the 1970's some people have published grammars for the languages to attempt to teach younger people to speak. These also can be useful, but each author uses his or her own understanding of the language, so they may not fit with the methodology disclosed herein.

2. Mining for Vocabulary

Once the above-discussed resources for the target, polysynthetic language are available, they are mined for vocabulary in the target language. (The grammatical terminology used by early missionaries may need to be converted to modern grammatical terms; however the grammatical and linguistic analyses of the earlier authors are not useful in embodiments of the invention except insofar as they help to provide the precise English meaning, person, and tense of the polysynthetic words in the target language. Grammars of the target language may be useful for determining categories of words that exist in the language but are not essential, because words alone can be used as exemplars.)

3. Converting Orthography

The orthography of sounds used by each earlier author are converted into present day diacritics. In order to identify the patterns of the target language, whatever system of orthography is employed in embodiments of the invention must be consistent within itself. The system of orthography employed can be based on the International Phonetic Alphabet. The system of orthography employed can be based on the orthography preferred by speakers of the target language, so long as that orthography is applied consistently within the materials being used in the target language. The system of orthography employed can be an orthography based on the sounds of the Romance languages, (vowels a, e, i, o, u) with combinations of letters creating sounds unique to the target language such as "ts" and 11" in Cherokee.

4. Finding WHO (a) In order to parse the target polysynthetic language, what persons are differentiated in the target language (WHO), as translated into the user language (e.g. English), are identified; these will most likely be different from the persons in the user language. For example, Cherokee recognizes ten persons doing the action: I; you (1) and I; you (plural) and I; s/he and I; they and I; you (1); you (2); you 3 or more; s/he or it; and they.

(b) Then, the different categories of the WHO parts of the polysynthetic word in the target language are identified. Many polysynthetic languages differentiate between active and non-active pronouns and also have a category of transitive pronouns: someone is doing the action to someone else. Some target languages distinguish between animate and inanimate; some differentiate among persons based on age, such as Oneida, which differentiates several categories of female pronouns based on age. A grammar of the language may be helpful in understanding these insofar as the grammar helps identify patterns in the target language. However, it is patterns in the target language which are being identified, not analysis.

(c) From the collected vocabulary of the target language, as exemplars a number of polysynthetic words are found, typically at least seven polysynthetic words, equivalent to the same number of sentences (e.g. seven) in the user language (e.g. English), using one of the persons in one of the categories.

For example seven polysynthetic words and their English equivalents for first person in the active category are found: "I am going, I am walking, I am speaking" in English and in the target language. That would be the "I—active" pronoun/category set.

Then the next pronoun/category set is found, which might be: You and I are going, You and I are running, You and I are speaking. That would be the "You and I—active" pronoun/category set, described by linguists as first person dual inclusive.

The process proceeds through all the persons, doing something in the active category set.

The same process is done for the non-active category, finding seven exemplars for each person in that category.

In regard to a transitive category, the WHO TO WHOM category, seven exemplars for each person in that category are found. (The WHO TO WHOM category can for convenience be expressed in a graph where the left hand column shows the active set of persons, who are the ones doing the action. The row across the top shows the active set of persons that the action is being done to. Where these intersect, shows the part of the word that expresses WHO is doing the action to WHOM.)

At least seven exemplars are found, in the form of polysynthetic and their equivalent English sentences for each of the WHO is doing it to WHOM combinations. For example, one set of seven polysynthetic words and their equivalent English sentences could be: I am hitting him, I am helping him, I am touching him, I am tying him, I am loving him, and so on. The next set could be: I am hitting you (1 person), I am helping you (1 person), I am touching you (1 person), I am tying you (1 person), I am loving you (1 person).

The verb does not have to be the same across the sets, so long as all the verbs in one set match the active, non-active, or transitive category.

(d) For each set of sentences:

Seven (or more) polysynthetic words with their English equivalent sentences are input to the deconstructor.

The deconstructor applies the function get_most_common_subsequence to each polysynthetic word.

The character string common to all the sentences should be the WHO for that person and pronoun category in the target language. Typically (but optionally) for confirmation that character string or common sequence is displayed to a user. With a sufficient number of exemplars, the deconstructor can reliably determine a character string common to the plurality of polysynthetic words as the likely character string for the known WHO in the user language. In user confirmation is employed, the user can accept the string displayed. In any event, the character string identified is stored with its equivalents in the user language, as a paired sequence. Also, the user can choose to enter more exemplars for confirmation.

This step in addition identifies the position of the WHO component within the polysynthetic word, as well as the placing of its column on the Grandmother Chart. In addition, the categories of WHO for the target language are confirmed.

(e) Step 4(d) is iterated for every person in every category to get all the possibilities for the WHO column of the Grandmother Chart. For example WHO with active pronouns; WHO with non-active pronouns; a separate chart for WHO to WHOM in the target language. There may be other categories as well.

5. Finding WHEN (a) In order to parse the target polysynthetic language, what "verb tenses" are differentiated in the target language (WHEN) are identified. Target language verb tenses may be different from those in the user language, e.g. English. For example, Cherokee recognizes seven times in which the action could be happening: present, immediate or command, future, past, past definitely, past reportedly, and possible future.

(b) Next the different categories of the WHEN parts of the polysynthetic word in the target language are identified.

(c) From the collected vocabulary of the target language, as exemplars at least seven polysynthetic words are found, equivalent to seven English sentences, using one of the tenses in one of the categories.

For example: present tense in the active category: "I am going, You and I are walking, They are speaking" in English and in the target language. That would be the "present" category set.

The next tense/category set might be: You and I wished, We hoped, They felt. That would be the "past" tense/category set.

Tenses must be precisely identified.

The verb does not have to be the same across the sets, so long as all the verbs in one set match the category of WHEN for the target language.

(d) For each set of sentences:

Typically seven (or more) polysynthetic words with their user language equivalent sentences are input to the deconstructor for each category of WHEN.

The deconstructor applies the function get_most_common_subsequence to the polysynthetic word and determines a character string common to the plurality of polysynthetic words as a likely character string in the target polysynthetic language for the particular category of WHEN.

The character string common to all the sentences should be the WHEN for that category/tense in the target language.

The character string common to all the sentences should be the WHEN for that person and pronoun category in the target language. Typically (but optionally) for confirmation that character string or common sequence is displayed to a user. With a sufficient number of exemplars, the deconstructor can reliably determine a character string common to the plurality of polysynthetic words as the likely character string for the particular category of WHEN in the user language. In user confirmation is employed, the user can accept the string displayed. In any event, the character string identified is stored with its equivalents in the user language, as a paired sequence. Also, the user can choose to enter more exemplars for confirmation.

This step in addition identifies the position of the WHEN component within the polysynthetic word, as well as the placing of its column on the Grandmother Chart in the target language.

It may be found that the category of WHO changes with changes in WHEN. This information becomes part of the algorithm for the Grandmother Chart for the target language. For example, in Cherokee, if the action is in the past at one point in time (HOW/WHEN) then the particle in the WHO column comes from the non-active category. The results of parsing will clearly show this for the target language.

Steps 5(c) and 5(d) are iterated for every tense in every category to get all the possibilities for the rows in the WHEN column of the Grandmother Chart.

6. Finding HOW (a) In order to parse the target polysynthetic language, what more information about how the verb tenses are differentiated in the target language is identified, expressing HOW the action is happening, which may be different from those in English. For example, Cherokee recognizes five ways in which the action could be happening: presently, immediately, continually/habitually, at one point in time, or in the possible future. These combine with WHEN the action is happening to give you all the tenses of the language. For example, the action can be happening at one point in the past: "I went;" or one point in the future: "I will go."

(b) From the collected vocabulary of the target language, typically at least seven polysynthetic words are found, equivalent to seven English sentences, that have the same WHEN and the same way HOW the action is happening. These can have different persons; it doesn't matter WHO is doing the action. For example: WHEN/HOW=past/continually: "I was going, You and I were walking, They were speaking" in English and in the target language. That would be the past/continually category set.

The next tense/category set might be: WHEN/HOW=past definitely/one point in time: You and I wished, definitely; We hoped, definitely; They felt, definitely.

Tenses must be precisely identified, even though English may not have the same HOW and WHEN categories as the target polysynthetic language.

The verb does not have to be the same across the sets, so long as all the verbs in one set match the category of WHEN and HOW for the target language.

(c) For each set of sentences:

As exemplars, seven (or more) polysynthetic words with their English equivalent sentences are input to the deconstructor for each category of WHEN/HOW.

The deconstructor applies the function get_most_common_subsequence to each polysynthetic word.

The character string common to all the sentences should be the WHEN/HOW for that category/tense in the target language That character string or common sequence is displayed to a user. The user can accept the string displayed, and it is stored with its English equivalent. Also, the user can choose to enter more exemplars for confirmation. The character string common to all the sentences should be the WHEN for that person and pronoun category in the target language. Typically (but optionally) for confirmation that character string or common sequence is displayed to a user. With a sufficient number of exemplars, the deconstructor can reliably determine a character string common to the plurality of polysynthetic words as the likely character string for the particular WHEN/HOW category set in the user language. In user confirmation is employed, the user can accept the string displayed. In any event, the character string identified is stored with its equivalents in the user language, as a paired sequence. Also, the user can choose to enter more exemplars for confirmation.

(d) Then, the deconstructor subtracts the already identified WHEN for each category (for example, past) to get the HOW for that category of WHEN/HOW. This step in addition identifies the position of the HOW component within the polysynthetic word, as well as the position of its column on the Grandmother Chart.

(e) Steps 6(c) and 6(d) are iterated for every tense in every category to get all the possibilities for the rows under the HOW column of the Grandmother Chart. There may be more than one possibility for HOW depending on the word.

7. Finding More about WHEN/HOW

If the target polysynthetic language can add more possibilities than the basic HOW/WHEN, this is accomplished by first going through the above steps, then choosing words that have the same HOW/WHEN but additional information where the additional information falls in the same category: these may be repetitions of the above categories, inserted at different locations. For example in Cherokee, dagesi=I will go. By adding another particle for tense, this becomes dagesisvi, I will have gone.

If the target language has more options, in other component locations for HOW/WHEN, iteration through the same basic steps to parse out the characters, and locations, of those additional options is necessary.

The seven times in which the action could be happening recognized in the Cherokee language (present, immediate or command, future, past, past definitely, past reportedly, and possible future) combine with five ways the action could be happening, or HOW the action is happening (presently, immediately, continually, at one point, and in the possible future). A summary is presented in the following table:

| HOW | WHEN |
|---|---|
| presently | present |
| immediately | immediate/command |
| continually | present |
| continually | future |
| continually | past |
| continually | past, definitely |
| continually | past, reportedly |
| at one point | future |
| at one point | past |
| at one point | past, definitely |
| at one point | past, reportedly |
| possible future | possible future |

8. Finding NOT (a) Each polysynthetic language could have a different way of creating the negative form of a word. This could be a prefix, or a suffix, or a portion in the middle of the word.

(b) From the collected vocabulary of the target language, at least seven polysynthetic words are identified, equivalent to seven English sentences, that indicate the negative in the target language. Polysynthetic words that have different WHO, HOW and WHEN components may be selected so that the only common portion of the word will be the negative. For example, I am not going, we did not speak, they will not have it.

(c) For each set of sentences:
Seven (or more) polysynthetic words with their English equivalent sentences are input.

The deconstructor applies the function get_most_common_subsequence to the polysynthetic word.

The character string common to all the sentences should be the character string for whatever indicates NOT in the target language. The common character string or sequence is displayed to a user. The user can accept the string displayed, and it is stored with its English equivalent. Also, the user can choose to enter more exemplars for confirmation.

Once the user affirms the character string and its English equivalent, both are stored as a paired sequence, if user confirmation is employed.

This step in addition identifies the position of the NOT component within the polysynthetic word.

(d) If the target language uses multiple ways to make a word negative, Steps 8(b) and 8(c) are iterated to identify all the ways to make a word negative, and to identify any alternate locations, or columns, in the Grandmother Chart.

9. Finding PLURALS (a) Each target polysynthetic language has a way of indicating plural. These may have different categories within the language. For example, Cherokee has different categories such as plural animate things, plural inanimate things, and plural actions. If these categories can be determined from extant grammars, that determination provides a basis for sorting within them. If not, the patterns will emerge through the following process.

(b) From the collected vocabulary of the target language, at least seven polysynthetic words are found, equivalent to seven English sentences, representing singular and plural actions. For example in Cherokee: I went, agwenvsv, I went many times, dagwenvsv. Or Indian (person), yvwiya, Indian people, aniyvwiya. Pairs of polysynthetic words that are the same except for their singular and plural aspect are chosen.

(c) For each set of sentences:
Seven (or more) polysynthetic words with their English equivalent sentences are input to the deconstructor.

The deconstructor applies the function get_most_common_subsequence to the polysynthetic word.

The character string common to all the sentences should be the character string for whatever indicates PLURAL in the target language. The common character string or sequence is displayed to a user, if user confirmation is employed. The user can accept the string displayed, and it is stored with its English equivalent. Also, the user can choose to enter more exemplars for confirmation.

Once the user affirms the character string and its English equivalent, both are stored as a paired sequence.

This step in addition will also identify the position of the PLURAL component within the polysynthetic word and the position of its column on the Grandmother Chart.

(d) Steps 9(b) and 9(c) are iterated to identify all the PLURAL indicators, and to identify any alternate locations, or columns, in the Grandmother Chart.

10. Finding INDICATORS OF DIRECTION (a) Each target polysynthetic language could have a different way of indicating the direction of a word. One character string may mean the action is going away from while another indicates the action is coming toward. These strings could be located in the prefix, suffix, or middle portion of the word.

(b) From the collected vocabulary of the target language, at least seven polysynthetic words are found, equivalent to seven English sentences, that represent each of the directional components in the target language. Polysynthetic words that have different WHO, HOW and WHEN components are chosen, so that the only common portion of the word is the directional.

(c) For each set of sentences:
Seven (or more) polysynthetic words with their English equivalent sentences are input to the deconstructor.
The deconstructor applies the function get_most_common_subsequence to the polysynthetic word.
The character string common to all the sentences should be the character string for whatever indicates DIRECTION in the target language. That common character string or sequence is displayed to a user, if user confirmation is employed. The user can accept the string displayed, and it is stored with its English equivalent. Also, the user can choose to enter more exemplars for confirmation.
Once the user affirms the character string and its English equivalent, both are stored as a paired sequence.
This step in addition identifies the position of the DIRECTION component within the polysynthetic word.
(d) If the target language has multiple directional indicators, Steps 10(b) and 10(c) are iterated to identify all the DIRECTION indicators, and to identify any alternate locations, or columns, in the Grandmother Chart.

11. Finding INDICATORS OF PLACE
(a) Each polysynthetic language could have a different, or multiple ways of indicating place names. These strings could be located in the prefix, suffix, or middle portion of the word. For example, a location could be known literally as "the water is flowing place." In Cherokee language this would use the verb form for "water is flowing" plus a final suffix of either hi or yi.
(b) From the collected vocabulary of the target language, at least seven polysynthetic words are found, equivalent to seven English sentences, that are considered place names in the target language. Polysynthetic words that have different WHO, HOW and WHEN components are chosen, so that the only common portion of the word is the directional.
(c) For each set of sentences:
Seven (or more) polysynthetic words with their English equivalent sentences are input to the deconstructor.
The deconstructor applies the function get_most_common_subsequence to the polysynthetic word. The character string common to all the sentences should be the character string for whatever indicates PLACE in the target language. That common character string or sequence is displayed to a user, if user confirmation is employed. The user can accept the string displayed, and it is stored with its English equivalent. Also, the user can choose to enter more exemplars for confirmation.
Once the user affirms the character string and its English equivalent, both are stored as a paired sequence.
This step in addition identifies the position of the PLACE component within the polysynthetic word.
(d) If the target language has multiple place name indicators, Steps 11(b) and 11(c) are iterated to for each of the possibilities, and to identify any alternate locations, or columns, in the Grandmother Chart.

12. Finding QUESTIONS
(a) Each polysynthetic language could have a different, or multiple ways of indicating the polysynthetic word is a question. These strings could be located in the prefix, suffix, or middle portion of the word. For example, in Cherokee language "gatsv is added to the beginning of the word to ask "where" someone is going: gatsv inega for "Where are you and I going?" Alternately, "sgo" is added to the end of the word to make it a generic question: inegasgo for "Are you and I going?"
(b) From the collected vocabulary of the target language, at least seven polysynthetic words are found, equivalent to seven English sentences, for each of the ways to ask a question. Polysynthetic words that have different WHO, HOW and WHEN components are chosen, so that the only common portion of the word is the question indicator.
(c) For each set of sentences:
Seven (or more) polysynthetic words with their English equivalent sentences are input to the deconstructor.
The deconstructor applies the function get_most_common_subsequence to the polysynthetic word. The character string common to all the sentences should be the character string for whatever indicates each QUESTION in the target language. The common character string or sequence is displayed to a user, if user confirmation is employed. The user can accept the string displayed, and it is stored with its English equivalent. Also, the user can choose to enter more exemplars for confirmation.
Once the user affirms the character string and its English equivalent, both are stored as a paired sequence.
This step in addition identifies the position of the QUESTION component within the polysynthetic word.
(d) If the target language has multiple indicators for asking questions, Steps 12(b) and 12(c) are iterated for each of the possibilities, and to identify any alternate locations, or columns, in the Grandmother Chart.

13. Finding OTHER
(a) Each target language may have additional options for some of the components. For example, in Cherokee language adding "iyusti" to the far right end of the polysynthetic word indicates "it is like."
(b) From the collected vocabulary of the target language, other options or indicators in the target language are identified.
(c) From the collected vocabulary of the target language, at least seven polysynthetic words are found, equivalent to seven English sentences, for each of the other options identified in the target language.
(d) For each set of sentences:
Seven (or more) polysynthetic words with their English equivalent sentences are input to the deconstructor.
The deconstructor applies the function get_most_common_subsequence to the polysynthetic word.
The character string common to all the sentences should be the character string for whatever the OTHER string indicates in the target language. The common character string or sequence is displayed to a user, if user confirmation is employed. The user can accept the string displayed, and it is stored with its English equivalent. Also, the user can choose to enter more exemplars for confirmation.
Once the user affirms the character string and its English equivalent, both are stored as a paired sequence.
(e) Steps 13(c) and 13(d) are iterated for each option to get all possibilities and to as well as the correct location or column of the Grandmother Chart.

14. Finding ELISIONS
Most languages have certain vowel/vowel or consonant/consonant, or vowel/consonant or consonant/vowel pairings that are not used in the language.
For each of the components identified above, it is necessary to go back one letter to the left to check for a standard optional character. In some cases it is necessary to go forward one letter to the right, depending on where in the polysynthetic word the component is located. For example, in Cherokee the WHO form for "I" is the letter "g". If the next component of the polysynthetic word (WHAT) begins with a consonant, then the WHO form becomes "ga." If the next component of the polysynthetic word (WHAT) begins with a vowel, then the WHO form is simply "g."
It is important to note that the characters considered vowels and consonants in the target language may not be the same as the vowels and consonants in English. For example, in Cherokee "v" is used to indicate the vowel short u pronounced nasally.

In order to identify the optional characters for the elisions, it is necessary to iterate through each of the components. Alternate sets of options for each component may then be stored.

15. Finding VERB CLANS

Some English verbs conjugate in a standard formula, such as learn, learning, learned, while others may conjugate as go, going, went. Verb clans are groups of verbs in the target language that all conjugate in the same way.

For example, in Cherokee language, the last three letters in the third person, present tense, form of the word identify the verb clan, or cluster. All Cherokee polysynthetic words that end with the same three letters in that tense will conjugate HOW/WHEN with the same set of characters.

Within that set, there are three subsets in which the WHO component uses the same set of characters. Each target language has a pattern on which the verb clans can be clustered, although the form that identifies that pattern may be different.

From the corpus of data collected so far, a comparator 12 groups words into clusters using strict partitioning clustering (each object belongs to exactly one cluster). In FIG. 1B, the comparator 12 is represented by the FINDING VERB CLANS SUBROUTINE.

All root words that have the same set of changes in the HOW/WHEN components for their tenses are extracted from the data set.

Each set of words is sorted into groups that use the same WHO components.

The process is iterated until all the words in the corpus have been assigned to a cluster where the HOW/WHEN and WHO options used are exactly the same for each word in the cluster. These groupings are displayed to the user. The user confirms that 3rd person present is the unique identifier for the group that can be used as the single mean vector, or centroid, for that cluster. If not, then the user confirms what the person and tense the identifier will be for verb clans for the target language.

The distinguishing form and identifying characters are then stored as the names for the verb clans.

For example, in Cherokee language the last two characters of the third person present tense form are either 'a, ha, ga, or sga. Moving to the left one character gives 24 clusters: a'a, e'a, i'a, o'a, u'a, v'a, aha, eha, iha, oha, uha, vha, aga, ega, iga, oga, uga, vha, saga, esga, isga, osga, usga and vsga. Every word in the language fits into one of these clusters, and all words within the cluster use the same set of characters or a subset for their conjugations.

16. Finding WHAT (a) Using the stored WHO, HOW/WHEN, NEGATIVE, QUESTION, PLACE, and any other components identified in the target language, the deconstructor removes those characters from their locations within any polysynthetic word in the target language to find the WHAT (what action is being done) component.

(b) That character string is then stored with its English equivalent as a pair. This is the verb root of the polysynthetic word. Unlike English, this root can never stand alone.

17. Building the Grandmother Chart for the Unknown Language (a) In the example disclosed herein, the parsing reference database or Grandmother Chart may simply be represented on a single page representing of all the data extracted to this point, including the locations of each conceptual column: WHO, WHAT, HOW, WHEN, and others, representing parts of a polysynthetic word, and the finite number of possibilities for each conceptual row below those headings.

Data may be entered into a paper version of the Grandmother Chart with each iteration of the above steps.

Alternately, the deconstructor can store all the values and print it at any point.

All the possibilities for the column WHAT will not fit on one page unless the exemplars in the target language are extremely limited.

(b) After building the parsing reference database or Grandmother Chart, a computer-implemented programming can be employed to construct and deconstruct words in the target polysynthetic language, using the Construct One, Construct All, Deconstruct One, and WHO TO WHOM algorithms or programs as also described herein.

18. Dealing with PROBLEMATIC WORDS

It is likely that after completion of all the steps above, there are some polysynthetic words in the target language that do not match any of the patterns identified. There are several possible reasons for this:

(a) The person who collected and wrote down the word did not hear it correctly.

(b) There may be characters or syllables that are incorrect or missing.

(c) There could be an error in converting the orthography.

(d) Native speakers may not agree on the "correct" form of a word because of language loss.

(e) Dialects may exist in the language. If exemplars from one dialect are selected, this will not be a problem. If the exemplars used are from multiple dialects, they will be expressed as multiple possibilities on the Grandmother Chart, but the structure of the language will remain the same.

(f) The user language (e.g. English) equivalent of the exemplars may not have been recorded precisely enough to express the categories of the target language.

"Grandmother Chart" for Cherokee Language

Figure 2:
FIGS. 2 and 3 are a conceptual drawing of a parsing reference database or Grandmother Chart embodied as a machine.
Figure 3:
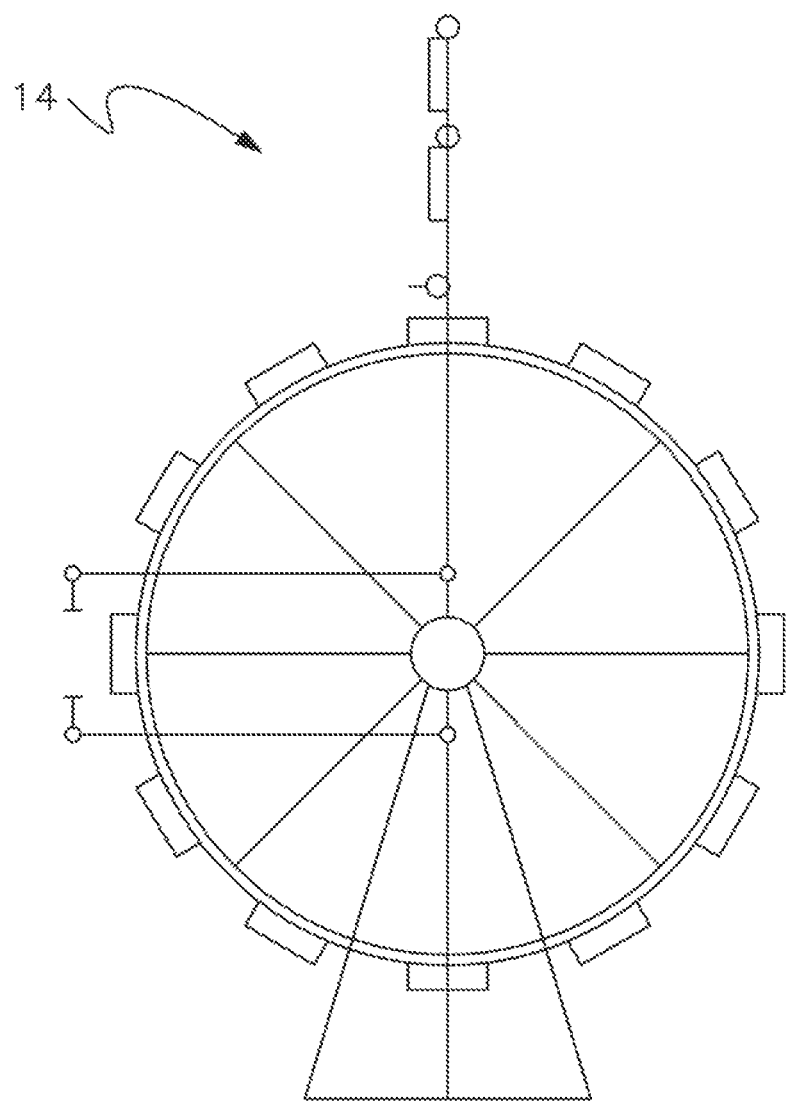

FIGS. 2 and 3 are a conceptual drawing of a parsing reference database or Grandmother Chart embodied as a machine 14. Each column on the chart is on a wheel, and one choice appears in the window/slot at the front of the machine. The wheels operate independently. A user selects one choice from each wheel. Each wheel is similar to a vertical slide rule. Not all the possibilities are visible from the front of the machine. The wheel for the WHAT column requires additional interchangeable wheels (not shown) to add more possible verb roots/meanings.

On the following page, as an example, is a parsing reference database or "Grandmother Chart" for the Cherokee language:

GRANDMOTHER CHART - © 2012 Flying Lizard Languages LLC

| | PREFIX | | WHO | WHAT | HOW | | WHEN | MORE ABOUT WHEN | FINAL SUFFIX |
|---|---|---|---|---|---|---|---|---|---|
| 1 | ts(i) | definitely | g- I | [verb stem] | present | h,sg, or g | a | | ya | real one |
| 2 | y(i) | if/negative | in- you and I | | | | | yu | very |
| 3 | w(i) | going away | id- all of us and I | | command | (h)--s,ts,g, ih, sesd | a or i | | yi, hi, i | place |
| 4 | n(i) | near | ost- s/he and I | | immediately | (sg)--g, h | | vhy | quo | just, continuing |

| PREFIX | | WHO | WHAT | HOW | WHEN | | MORE ABOUT WHEN | FINAL SUFFIX | |
|---|---|---|---|---|---|---|---|---|---|
| 5 de | plural | ots- | they and I | | (g)--n,sg,esdi | | esdi | ne,sine | 1st, 2nd, etc |
| 6 da or ta | coming towards | h- | you (1) | continually | (h)--h or sg | oi | | tsu,sko | makes a question |
| 7 tsa/yi | negative | ist- | you (2) | | (sg)--sg | vgi | | hno | because |
| 8 | | its- | you (3) | | (g)--g | ei | | | |
| 9 | | - | he/she/it | | | esdi | | | |
| 10 | time=space | an- | they | at one point | (h)--l,s, h, (sg)--n | da-i (future) | oi | | |
| | | | | | (g)--nvs, ts | | vgi | | |
| | | | See WHO-TO-WHO | | | | ei | | |
| | | | | | | | esdi | | |
| | | | | | | ag-v (past) | | | |
| | | | | | | | oi | | |
| | | | | | | | vgi | | |
| | | | | | | | ei | | |
| | | | | | | | esdi | | |
| | | | | to do it | h or s | di | | | |
| | | | | | | | oi | | |
| | | | | | | | vgi | | |
| | | | | | | | ei | | |
| | | | | | | | esdi | | |
| | | | | | | | | iyuhsti | it's like |

Accordingly, the parsing reference database or Grandmother Chart and using the parsing reference database represents a method for analyzing units of meaning in polysynthetic words to show the most consistent patterns in these units regardless of correspondence to user language (e.g. English) grammar or linguistic categories. These units of meaning can be put into categories/columns on the grandmother chart such that each column has a finite number of possibilities. Combining one possibility from each column results in a word that is equivalent to an English sentence, commonly called polysynthetic words. An option from the WHO column can be selected to express who is doing the action. An option from the WHAT column can be selected to express what action is taking place. An option from the HOW column can be selected to express how the action is taking place, such as continually/habitually. An option from the WHEN column can be selected to express when the action is taking place, such as past or future. Optionally, selections can be made from the prefixes, suffixes, and additional columns. As a result, words in the polysynthetic language can be deconstructed and reconstructed without learning the entire word by rote as is conventional practice. This is a significant aid to students learning the language.

In addition, matrices can be created that multiply into what are herein termed "grandbaby" charts. For example, each possibility in the WHAT column transforms into a matrix showing first person forms of all commonly used tenses, organized to show consistent simple patterns. Each line of the matrix multiplies into all the pronoun possibilities of the language by means of "grandbaby" charts. Each polysynthetic word can be made negative.

Still further, the comparator 12 analyzes verb stems into verb clans. Verb stems are classified into the simplest and most consistent sets of changes for conjugation. By organizing verbs according to the last three letters and or glottal stops of the present tense, simple categories are revealed. If additional categories are needed, verbs can be organized by proceeding to the next letter to the left, in the present tense. Students are able to predict the contents of the HOW and WHEN columns based on the last three or more letters of the present tense of any word in the target language.

On the following four pages are the first four pages of a Verb Clan chart, for the Cherokee language, as an example.

| VERB CLAN 'a Cherokee | English | prefix | WHO | WHAT | HOW/ WHEN | | | | |
|---|---|---|---|---|---|---|---|---|---|
| | | | | | present | command | continually-- remove o'i and add esdi for future, -vgi, -vi, -ei for past | one point-- add da prefix and i ending for future, change WHO and add vi, vgi, ei for past | to do it-- the possible future. Change WHO | comments |

-continued

VERB CLAN A'A - © 2012 Flying Lizard Languages LLC

| VERB CLAN 'a Cherokee | English | prefix | WHO | WHAT | | HOW/WHEN | | | |
|---|---|---|---|---|---|---|---|---|---|
| A'A | | | | | | | | | |
| a di si ya' a | S/he's leaving a long object behind | | | a di si y | a'a | a | asgo'i | ' | asdi | to be used only when leaving a long, rigid object behind, like a pencil df11 |
| a de hlo gwa 'a | s/he's learning or learning it | | | adehlogw | a'a | a | asgo'i | ' | asdi | df8, dk |
| a hi ya 'a | S/he's leaving it behind | | I=tsi | ahiy | a'a | a | asao'i | ' | asdi | df21, dk says animate |
| a li to gi ya 'a | S/hes racing (on foot), or running for office | | | atogiy | a'a | a | asgo'i | ' | asdi | df60, dk |
| ga ka hi ya 'a | S/he's leaving a living thing behind | | I=tsi | akahiy | a'a | a | asgo'i | ' | asdi | df98 |
| ga ne hi ya 'a | S/he's leaving liquid behind | | I=tsi | anehiy | a'a | a | asgo'i | ' | asdi | df106, dk |
| ga ni ya 'a | S/he's leaving flexible thing behind | | I=tsi | aniy | a'a | a | asgo'i | ' | asdi | df109 |
| u do da gwa 'a | S/he's taking a vacation | | I=agw | adodagw | a'a | a | asgo'i | ' | asdi | dk only |
| ka no hi ya 'a | S/he's omitting her/him/it | | I=tsi | anohiy | a'a | a | asgo'i | ' | asdi | df141 |
| ga nu la sa 'a | S/he's covered with dirt | | I=tsi | anulas | a'a | vga | asgo'i | vn | vdi | dk |
| ga na 'a | S/he's lying down | | I=tsi | an | a'a | vga | asgo'i | an | adi | |
| a ni do na 'a | They are standing (congregation) | | (otsi=I) | anidon | a'a | no form | o'i | ' | no form | df45 |
| a ya 'a | S/he's inside | | I=tsi | ay | a'a | no form | o'i | no form | | df62 |
| ga da 'a | Flexible object is hanging | | g | ad | a'a | esdi | a o'i | no form | no form | df91 |
| u tsa 'a | S/he's inside it | | I=agw | ats | a'a | a'esdi | o'i | ' | no form | df170, dk |
| E'A | | | | | | | | | |
| a go li ye 'a | S/he's reading examing him, it | | | agoliy | e'a | a | esgo'i | e | edi | df 17-18, dk no |
| a s go li ye 'a | S/he's rubbing her, him, it | | I=tsi | asgoliy | e'a | a | esgo'i | e | edi | df50 |
| de gv di ye 'a | S/he's washing dishes | de | I=g | vdiy | e'a | a | esgo'i | e | edi | df78, dk |
| ga lo ne 'a | S/he's oiling it | | I=tsi | alon | e'a | a | esgo'i | e | edi | df101, |
| ga lv we 'a | S/he's winding yarn or thread | | I=tsi | alvw | e'a | a | esgo'i | e | edi | dk |
| a dle 'a | S/he's turning off the road | | | adl | e'a | agi | esgo'i | e | esdi | df11-12 |
| a hna we 'a | S/he's taking her/his shirt or coat off | | | ahnaw | e'a | agi | esgo'i | e | esdi | df24, dkno |
| a hyv te 'a | S/he's kicking him, her, it | | | ahyvt | e'a | agi | esgo'i | e | esdi | df29, dk=alotehiha |
| a ko de 'a | S/he's shoveling | | I=tsi | akod | e'a | agi | esgo'i | e | esdi | df33, dk |
| a li s du le 'a | S/he's taking off her/his cap | | | alisdul | e'a | agi | esgo'i | e | esdi | df41, |
| a s gwa hle 'a | S/he's catching a faling person, object | | I=tsi | asgwahl | e'a | agi | esgo'i | e | esdi | df52 |
| a su le 'a | S/he's taking her/his pants off | | | asul | e'a | agi | esgo'i | e | esdi | df55 |
| a su ye 'a | S/he's choosing her/him/it | | (I=tsi optional) | asuy | e'a | agi | esgo'i | e | esdi | df56 |
| a tsi sde 'a | S/he's taking a bite | | | atsisd | e'a | agi | esgo'i | e | esdi | df60 |

| VERB CLAN 'a Cherokee | English | prefix | WHO | WHAT | HOW/WHEN | | | | | |
|---|---|---|---|---|---|---|---|---|---|---|
| a tsv si ye 'a | S/he's pacing | | I=g | atsvsiy | e'a | a | esgo'i | e | esdi | dk only |
| da hna we 'a | S/he's taking off clothes | de | | ahnaw | e'a | agi | esgo'i | es | esdi | df69 |
| da ga ti nv de 'a | S/he's taking off her/his glasses | de | I= de+g | agatinvd | e'a | agi | esgo'i | es | esdi | df71 |
| da la su le 'a | S/he's taking off her/his shoes | de | I= de+g | alasul | e'a | agi | esgo'i | es | esdi | df72, dk |
| da li ye su le 'a | S/he's taking off her/his gloves | de | I= de+g | aliyesul | e'a | agi | esgo'i | es | esdi | df73 |
| ga de 'a | S/he's removing it from a hanging position (solid or flexible) | | I=g | ad | e'a | agi | esgo'i | es | esdi | df91, dk |
| ga le 'a | S/he's taking it (solid or flex) out of container | | I=tsi | al | e'a | agi | esgo'i | es | esdi | df99 |
| ga ne 'a | S/he's getting or picking up a flexible object | | I=tsi | an | e'a | agi | esgo'i | es | esdi | df104 |
| ga na sa ne 'a | S/he's pulling her/him/it | | I=g or tsi | ansan | e'a | agi | esgo'i | es | esdi | df111, |
| go tsa ne'a | S/he's pulling a trigger | | I=g | otsan | e'a | agi | esgo'i | es | esdi | df122, |
| gu da le'a | S/he's unhitching, unhooking, unplugging it | | I=g or tsi | udal | e'a | agi | esgo'i | es | esdi | df123 |
| | | | | | | | | | | dk=dugalagi'a |

Next below is a Matrix chart for "GO", followed by a Grandbaby chart for "GO". This is an example of a parser that matches a polysynthetic word to its corresponding verb clan conjugation pattern, thereby providing correct text strings for constructing those words.

MATRIX GO - © 2012 Flying Lizard Languages LLC

| prefix | WHO | WHAT | HOW | WHEN | English | Word in syllables | |
|---|---|---|---|---|---|---|---|
| | g | e | g | a | I am going | ge ga | present |
| | g | e | n | a | I am just about to go, just went | ge na | immediately/command |
| | g | e | g | o'i | I go | ge go i | continually |
| | g | e | g | esdi | I will be going | ge ge sdi | continually, future |
| | g | e | g | v'i | I was going | ge gv i | continually, past |
| | g | e | g | v gi | I was going, definitely | ge gv gi | continually, past, definitely |
| | g | e | g | e'i | I was going, they say | ge ge i | continually, past, they say |
| da | g | e | s | i | I will go | da ge si | one point in time, future |
| | agw | e | nvs | v'i | I went | a gwe nv sv i | one point in time, past |
| | agw | e | nvs | v gi | I went, definitely | a gwe nv sv gi | one point in time, past, definitely |
| | agw | e | nvs | e'i | I went, they say | a gwe nv se i | one point in time, past, they say |
| | agw | e | nvs | di | I to go | a gwe nv sdi | possible future |

GRANDBABY CHART GO - © 2012 Flying Lizard Languages LLC

| prefix | WHO | WHAT | HOW | WHEN | English meaning | To pronounce it in syllables |
|---|---|---|---|---|---|---|
| PRESENT | | | | | | |
| | g | | | | I | |
| | | e | | | go | |
| | | | g | | present | |
| | | | | a | present | |
| | | | | | I am going | ge ga |
| | g | e | g | a | I am going | ge ga |
| | in | e | g | a | You & I are going | i ne ga |
| | id | e | g | a | We all are going | i de ga |
| | ost | e | g | a | He/she & I are going | o ste ga |
| | ots | e | g | a | They & I are going | o tse ga |
| | h | e | g | a | You (1) are going | he ga |
| | ist | e | g | a | You (2) are going | i ste ga |
| | its | e | g | a | You all are going | i tse ga |
| | | e | g | a | He/she/it is going | e ga |
| | an | e | g | a | They are going | a ne ga |
| COMMAND/ IMMEDIATE | | | | | | |
| | h | | | | you | |
| | | e | | | go | |
| | | | n | | command, immediate past or present | |
| | | | | a | command, immediate past or present | |
| | | | | | you go | (In English, the "you" is understood. We just say "Go") he na |
| | g | e | n | a | I am about to go or just went | ge na |
| | in | e | n | a | You & I are about to go or just went OR Let's you and I go (command) | i ne na |
| | id | e | n | a | We all are about to go or just went OR Let's all go | i de na |
| | ost | e | n | a | He/she & I are about to go or just went | o ste na |
| | ots | e | n | a | They & I are about to go or just went | o tse na |
| | h | e | n | a | You (1) are about to go or just went OR You go! | he na |

| GRANDBABY CHART GO - © 2012 Flying Lizard Languages LLC | | | | | | |
|---|---|---|---|---|---|---|
| prefix | WHO | WHAT | HOW | WHEN | English meaning | To pronounce it in syllables |
| | ist | e | n | a | You (2) are about to go or just went OR You two go! | i ste na |
| | its | e | n | a | You all are about to go or just went OR You all go! | i tse na |
| | | e | n | a | He/she/it is about to go or just went | e na |
| | an | e | n | a | They are about to go or just went All of these can be interpreted as commands, like let's you and I go In addition, you can add the prefixes for directions | a ne na |
| w | h | e | n | a | you go away | hwe na The h moves in front of the w, so you can hear it and distinguish this form from wena, he/she just went away, are just about to go away. |
| da | h | e | n | a | you come here/towards me | te na (d + h = t) |
| CONTINUALLY— HABITUALLY | | | | | | |
| | | g | | | I | |
| | | e | | | go | |
| | | | g | | present | |
| | | | | o'i | habitually | |
| | | | | | I go | ge go i |
| | g | e | g | o'i | I go | ge go i |
| | in | e | g | o'i | You & I go | i ne go i |
| | id | e | g | o'i | We all go | i de go i |
| | ost | e | g | o'i | He/she & I go | o ste go i |
| | ots | e | g | o'i | They & I go | o tse go i |
| | h | e | g | o'i | You (1) go | he go i |
| | ist | e | g | o'i | You (2) go | i ste go i |
| | its | e | g | o'i | You all go | i tse go i |
| | | e | g | o'i | He/she/it goes | e go i |
| | an | e | g | o'i | They go | a ne go i |

-continued

| GRANDBABY CHART GO - © 2012 Flying Lizard Languages LLC | | | | | | |
|---|---|---|---|---|---|---|
| prefix | WHO | WHAT | HOW | WHEN | English meaning | To pronounce it in syllables |
| THE PERSON DOING IT | | e | g | i | the goer | By taking the continual/habitual form, ego'i, he goes, and removing the o, you get the form for the person who is habitually doing something, the goer. This is usually in the form of he/she. |
| CONTINUALLY— FUTURE | | | | | | |
| | g | e | g | esdi | I will be going | ge ge sdi |
| | in | e | g | esdi | You and I will be going | i ne ge sdi |
| | id | e | g | esdi | We all will be going | i de ge sdi |
| | ost | e | g | esdi | He/she and I will be going | o ste ge sdi |
| | ots | e | g | esdi | They and I will be going | o tse ge sdi |
| | h | e | g | esdi | You (1) will be going | he ge sdi |
| | ist | e | g | esdi | You (2) will be going | i ste ge sdi |
| | its | e | g | esdi | You all will be going | i tse ge sdi |
| | | e | g | esdi | He/she will be going | e ge sdi |
| | an | e | g | esdi | They will be going | a ne ge sdi |
| CONTINUALLY— PAST | | | | | | |
| | g | e | g | v'i | I was going | ge gv i |
| | in | e | g | v'i | You and I were going | i ne gv i |
| | id | e | g | v'i | We all were going | i de gv i |
| | ost | e | g | v'i | He/she and I were going | o ste gv i |
| | ots | e | g | v'i | They and I were going | o tse gv i |
| | h | e | g | v'i | You (1) were going | he gv i |
| | ist | e | g | v'i | You (2) were going | i ste gv i |
| | its | e | g | v'i | You all were going | i tse gv i |
| | | e | g | v'i | He/she was going | e gv i |
| | an | e | g | v'i | They were going | a ne gv i |
| CONTINUALLY— PAST DEFINITELY | | | | | | |
| | g | e | g | v gi | I was going definitely | ge gv gi |
| | in | e | g | v gi | You and I were going definitely | i ne gv gi |
| | id | e | g | v gi | We all were going definitely | i de gv gi |

GRANDBABY CHART GO - © 2012 Flying Lizard Languages LLC

| prefix | WHO | WHAT | HOW | WHEN | English meaning | To pronounce it in syllables |
|---|---|---|---|---|---|---|
| | ost | e | g | v gi | He/she and I were going definitely | o ste gv gi |
| | ots | e | g | v gi | They and I were going definitely | o tse gv gi |
| | h | e | g | v gi | You (1) were going definitely | he gv gi |
| | ist | e | g | v gi | You (2) were going definitely | i ste gv gi |
| | its | e | g | v gi | You all were going definitely | i tse gv gi |
| | | e | g | v gi | He/she was going definitely | e gv gi |
| | an | e | g | v gi | They were going definitely | a ne gv gi |
| CONTINUALLY— PAST "THEY SAY" | | | | | | |
| | g | e | g | e'i | I was going, they say | ge ge 'i |
| | in | e | g | e'i | You and I were going, they say | i ne ge 'i |
| | id | e | g | e'i | We all were going, they say | i de ge 'i |
| | ost | e | g | e'i | He/she and I were going, they say | o ste ge 'i |
| | ots | e | g | e'i | They and I were going, they say | o tse ge 'i |
| | h | e | g | e'i | You (1) were going, they say | he ge 'i |
| | ist | e | g | e'i | You (2) were going, they say | i ste ge 'i |
| | its | e | g | e'i | You all were going, they say | i tse ge 'i |
| | | e | g | e'i | He/she was going, they say | e ge 'i |
| | an | e | g | e'i | They were going, they say | a ne ge 'i |
| ONE POINT IN TIME—FUTURE | | | | | | |
| da | | | | | future prefix | |
| | | g | | | I | |
| | | | e | | go | |
| | | | | s | one point in time | |
| | | | | i | future | |
| | | | | | I will go | da ge si |
| da | g | e | s | i | I will go | da ge si |
| da | in | e | s | i | You and I will go | di ne si |
| da | id | e | s | i | All of us will go | di de si |
| da | ost | e | s | i | S/he and I will go | do ste si or da yo ste si |
| da | ots | e | s | i | They and I will go | do tse si or da yo tse si |

GRANDBABY CHART GO - © 2012 Flying Lizard Languages LLC

| prefix | WHO | WHAT | HOW | WHEN | English meaning | To pronounce it in syllables |
|---|---|---|---|---|---|---|
| da | h | e | s | i | You (1) will go | te si (d + h = t) |
| da | ist | e | s | i | You (2) will go | di ste si |
| da | its | e | s | i | You all will go | di tse si |
| da |  | e | s | i | S/he will go | da ye si |
| da | an | e | s | i | They will go | dv ne si (a + a = v) |
| ONE POINT IN TIME—PAST | | | | | | |
|  | agw | e |  |  | future prefix I go | |
|  |  |  | nvs |  | one point in time | |
|  |  |  |  | v'i | past I went | a gwe nv sv 'i |
|  | agw | e | nvs | v'i | I went | a gwe nv sv i |
|  | gin | e | nvs | v'i | You and I went | gi ne nv sv i |
|  | ig | e | nvs | v'i | All of us went | i ge nv sv i |
|  | ogini | e | nvs | v'i | S/he and I went | o gi ne nv sv i |
|  | ogi | e | nvs | v'i | They and I went | o ge nv sv i |
|  | tsa | e | nvs | v'i | You (1) went | tsa we nv sv i |
|  | sti | e | nvs | v'i | You (2) went | ste nv sv i |
|  | itsi | e | nvs | v'i | You all went | i tse nv sv i |
|  | u | e | nvs | v'i | S/he went | u we nv sv i |
|  | un | e | nvs | v'i | They went | u ne nv sv i |
|  |  |  |  |  |  | tsa + e = tsa we |
| ONE POINT IN TIME—PAST DEFINITELY | | | | | | |
|  | agw | e |  |  | future prefix I go | |
|  |  |  | nvs |  | one point in time | |
|  |  |  |  | vgi | past I went | a gwe nv sv gi |
|  | agw | e | nvs | vgi | I went definitely | a gwe nv sv gi |
|  | gin | e | nvs | vgi | You and I went definitely | gi ne nv sv gi |
|  | ig | e | nvs | vgi | All of us went definitely | i ge nv sv gi |
|  | ogini | e | nvs | vgi | S/he and I went definitely | o gi ne nv sv gi |
|  | ogi | e | nvs | vgi | They and I went definitely | o ge nv sv gi |
|  | tsa | e | nvs | vgi | You (1) went definitely | tsa we nv sv gi |
|  | sti | e | nvs | vgi | You (2) went definitely | ste nv sv gi |
|  | itsi | e | nvs | vgi | You all went definitely | i tse nv sv gi |
|  | u | e | nvs | vgi | S/he went definitely | u we nv sv gi |
|  | un | e | nvs | vgi | They went definitely | u ne nv sv gi |

GRANDBABY CHART GO - © 2012 Flying Lizard Languages LLC

| prefix | WHO | WHAT | HOW | WHEN | English meaning | To pronounce it in syllables |
|---|---|---|---|---|---|---|
| ONE POINT IN TIME—PAST "THEY SAY" | | | | | | |
| | agw | | | | future prefix I go | |
| | | e | | | | |
| | | | nvs | | one point in time | |
| | | | | e'i | past | |
| | | | | | I went | a gwe nv se 'i |
| | agw | e | nvs | e'i | I went, they say | a gwe nv se 'i |
| | gin | e | nvs | e'i | You and I went, they say | gi ne nv se 'i |
| | ig | e | nvs | e'i | All of us went, they say | i ge nv se 'i |
| | ogini | e | nvs | e'i | S/he and I went, they say | o gi ne nv se 'i |
| | ogi | e | nvs | e'i | They and I went, they say | o ge nv se 'i |
| | tsa | e | nvs | e'i | You (1) went, they say | tsa we nv se 'i |
| | sti | e | nvs | e'i | You (2) went, they say | ste nv se 'i |
| | itsi | e | nvs | e'i | You all went, they say | i tse nv se 'i |
| | u | e | nvs | e'i | S/he went, they say | u we nv se 'i |
| | un | e | nvs | e'i | They went, they say | u ne nv se 'i |
| TO DO IT—POSSIBLE FUTURE | | | | | | |
| | agw | | | | I (being done to me) go | |
| | | e | | | | |
| | | | nvs | | to do it | |
| | | | | di | to do it | |
| | | | | | I to go | a gwe nv sdi |
| | agw | e | nvs | di | I to go | a gwe nv sdi |
| | gin | e | nvs | di | You & I to go | gi ne nv sdi |
| | ig | e | nvs | di | We all to go | i ge nv sdi |
| | ogini | e | nvs | di | He/she & I to go | o gi ne nv sdi |
| | ogi | e | nvs | di | They & I to go | o ge nv sdi |
| | tsa | e | nvs | di | You (1) to go | tsa we nv sdi |
| | sti | e | nvs | di | You (2) to go | ste nv sdi |
| | itsi | e | nvs | di | You all to go | i tse nv sdi |
| | u | e | nvs | di | He/she/it to go | u we nv sdi |

-continued

GRANDBABY CHART GO - © 2012 Flying Lizard Languages LLC

| prefix | WHO | WHAT | HOW | WHEN | English meaning | To pronounce it in syllables |
|--------|-----|------|-----|------|-----------------|------------------------------|
|        | un  | e    | nvs | di   | They to go This is used like: I want to go | u ne nv sdi |
|        |     |      |     |      | "I-to-go" I want I want him to go | agwenvsdi agwaduliha |
|        |     |      |     |      | "Him-to-go" I want | uwenvsdi agwaduliha |

Deconstruct Words from a Known Language

Figure 4A:
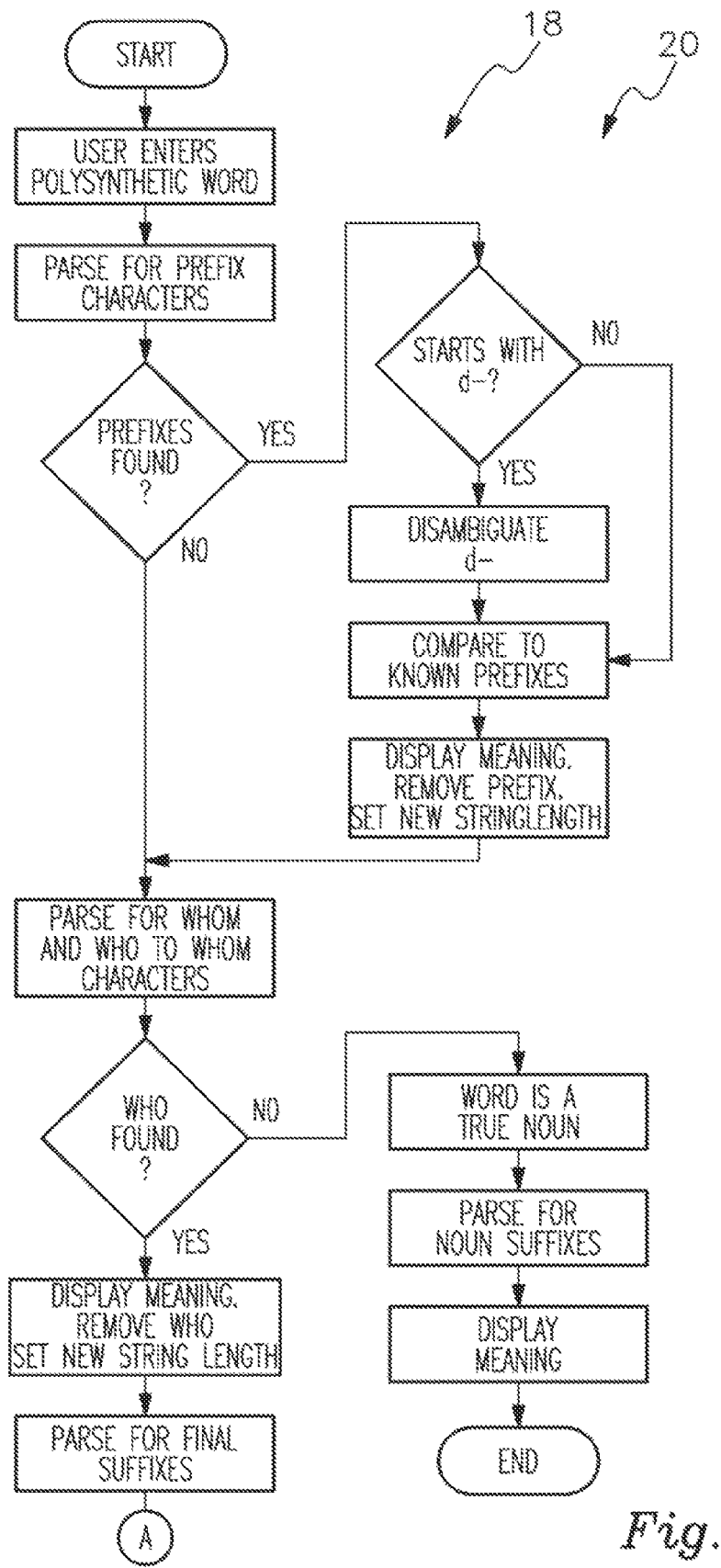
FIGS. 4A and 4B together are a flowchart representing a translation algorithm or program for translating one word in a known polysynthetic language for which a parsing reference database already exists, in other words, for translating a word in the target polysynthetic language (such as Cherokee, as an example) to the user language (such as English, as an example)
Figure 4B:
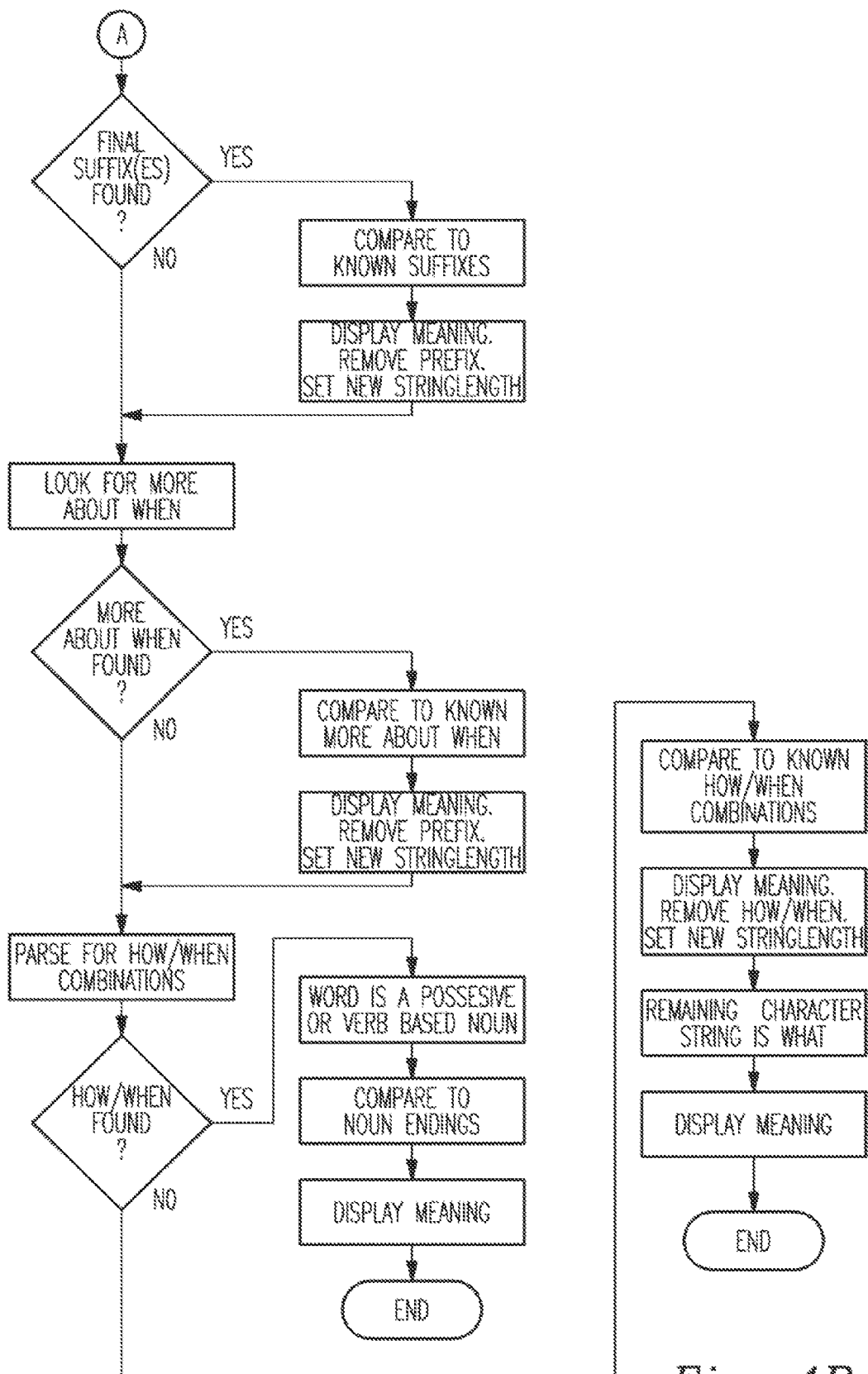

FIGS. 4A and 4B together are a flowchart representing a system 18 including a computer processor 124 (FIG. 13) for translating a word in a target polysynthetic language to a user language, i.e., for one word in a known polysynthetic language. It requires a parsing reference database for the language in order to operate. The system 18 of FIGS. 4A and 4B takes a polysynthetic word and breaks it into its component parts, which it displays to a user. The example is Cherokee, but its use is not limited to Cherokee.

The system 18 for translating allows an end user to enter a polysynthetic word. As the program executes, it separates that word into its component parts (WHO, WHAT, HOW, WHEN, and any prefixes or suffixes). The output is each component part, along with its English equivalent.

In the specific example of FIGS. 4A and 4B, the system 18 for translating one word is embodied in a program which has all the instructions coded into, and outputs stored in the program itself. As an alternative, the deconstructor for one word may be embodied in a program (not shown) which accesses a database containing the appropriate letters or syllables for each individual portion and displays them as the components of the polysynthetic word, with the English equivalents for the components. The system 18 includes a parser 20 which references a language parsing reference database, either by instructions coded into a computer program or by access to a separate database, the parsing reference database organized to include polysynthetic word parts WHO is doing an action, WHAT action is being done, HOW an action is happening, and WHEN an action is happening in the polysynthetic language. The parser 20 is thus operable to separate the word into component parts including word parts WHO, WHAT, HOW and WHEN and to provide an output in the user language.

Construct One Word in a Known Language

Figure 5:
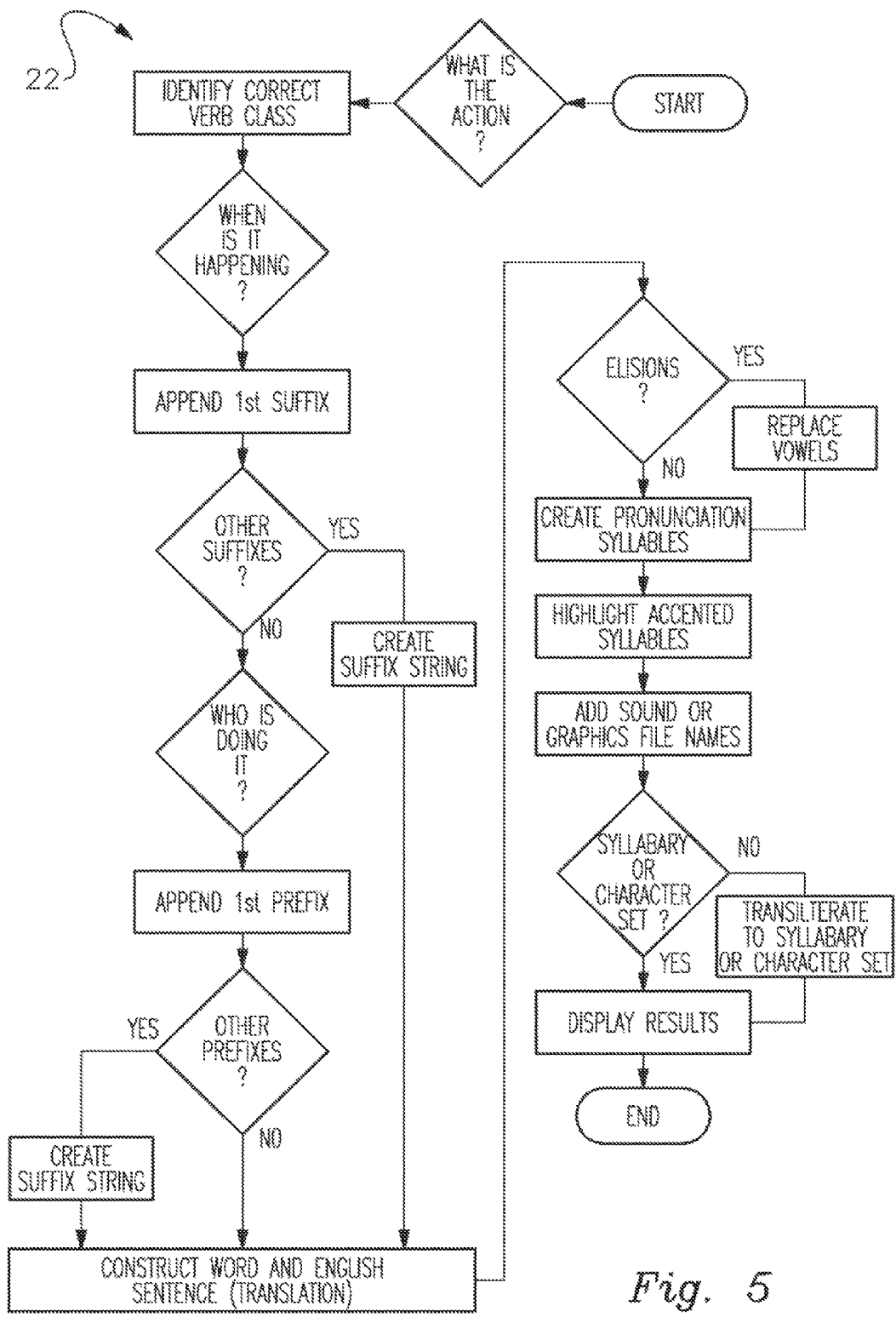
FIG. 5 is a flowchart representing a translation algorithm or program for translating or constructing one word in a known polysynthetic language where a parsing reference database already exists, in other words, for translating words from the user language (such as English, as an example) to a word in the target polysynthetic language (such as Cherokee, as an example)

FIG. 5 is a flowchart representing a system 22 including computer processor (e.g. FIG. 13, processor 124) and a constructor 22 which constructs one word in a known polysynthetic language where a parsing reference database already exists. The FIG. 5 system 22 allows a user to choose WHO, WHAT, and WHEN, along with options for the various prefixes and suffixes. As the program executes, it generates the correct form of the polysynthetic word. The output is one polysynthetic word, along with its English equivalent. The polysynthetic word is broken into syllables as an aid to pronunciation, any syllabary or other character set representation of the word, and a list of sound files for each of the syllables, so the user can hear them pronounced.

Briefly describing the FIG. 5 flowchart:
verb class is identified
the first suffix and other suffixes are appended
the first prefix and other prefixes are appended
the word in the target language is constructed, and the English sentence (translation)
vowels are replaced to create elisions
syllables for pronunciation are created
accented syllables are highlighted
sound or graphic file names are added
additional character set if used in the target language is added
results are displayed The FIG. 5 system 22 and constructor 22 accordingly references a language parsing reference database, either by instructions coded into a computer program or by access to a separate database, the parsing reference database organized to include polysynthetic word parts WHO is doing an action, WHAT action is being done, HOW an action is happening, and WHEN an action is happening in the polysynthetic language. The constructor 22 is operable to accept user input in the user language specifying WHO, WHAT, and HOW/WHEN and to construct and output a translated word in the target polysynthetic language.

FIGS. 6-10 are representative screen shots seen by an end user at a client terminal, such a personal computer connected to the internet communicating with a server computer running server-side software establishing a website and referencing the parsing reference database.

An end user on the website thus established initially sees a form represented by the screen shot of FIG. 6. In general, an end-user uses this form to make choices for constructing one word, which is delivered to the end-user via the internet website running server-side software. More particularly, using the "construct one" feature, users choose positive or negative constructions, pronouns, verbs, and tenses to make a word in the target language. Using the dictionary query, users find words by typing in words in English or in the target language in English characters or in the characters unique to that language. The server delivers the requested word in the target language as an English sentence, a polysyllabic word in the target language, that same word broken into syllables with the accented syllable in bold, that same word linked to audio files pronouncing the word. In the form of FIG. 6, for ease of use for the end user, the HOW and WHEN terminology is combined into one English selection, and the combined options are displayed under the WHEN column. The underlying program logic takes care of combining the HOW and WHEN parts of the Cherokee word.

In the specific example of FIG. 5 described above, the constructor for one word is embodied in a program which has all the instructions coded into the program itself. As an alternative, the constructor for one word may be embodied in a program (not shown) which accesses a database containing the appropriate letters or syllables for each individual portion and combines them into the polysynthetic word.

Still referring to FIG. 6, in the event the user selects a verb from the WHAT list which is what is herein termed "Who to Whom" verb, or in English the object of a transitive verb, then the form of the screen shot of FIG. 7 is presented, allowing the user to select the Whom/English object. The program flow chart of FIG. 13 described hereinbelow includes the who to whom question step. Its action box says "append first prefix." This is because in Cherokee both the who and whom are contained in the first prefix or WHO portion of the word.

Still referring to FIG. 6, when the end user selects a particular WHO choice, the screen display changes to offer to the user only those whom selections that are valid for that who.

Figure 9:
FIG. 9 is yet another screen shot illustrating an end-user input form presented via an internet website running server-side software.

Also, more than one WHO selection has the same WHOM subset of choices:

As further screen shot examples, FIG. 7 shows the user display for the "I" and "You (1) and I" and "You all and I" selections. FIG. 8 shows the user display for the "S/he and I" and "They and I" selections. FIG. 9 shows the user display for the "You (1)" "You (2)" and "You (3+)" selections. FIG. 10 shows the user display of the "S/he or it" "They (alive)" and "They (not alive)" selections.

Construct all Words in a Known Language

Figure 11A:
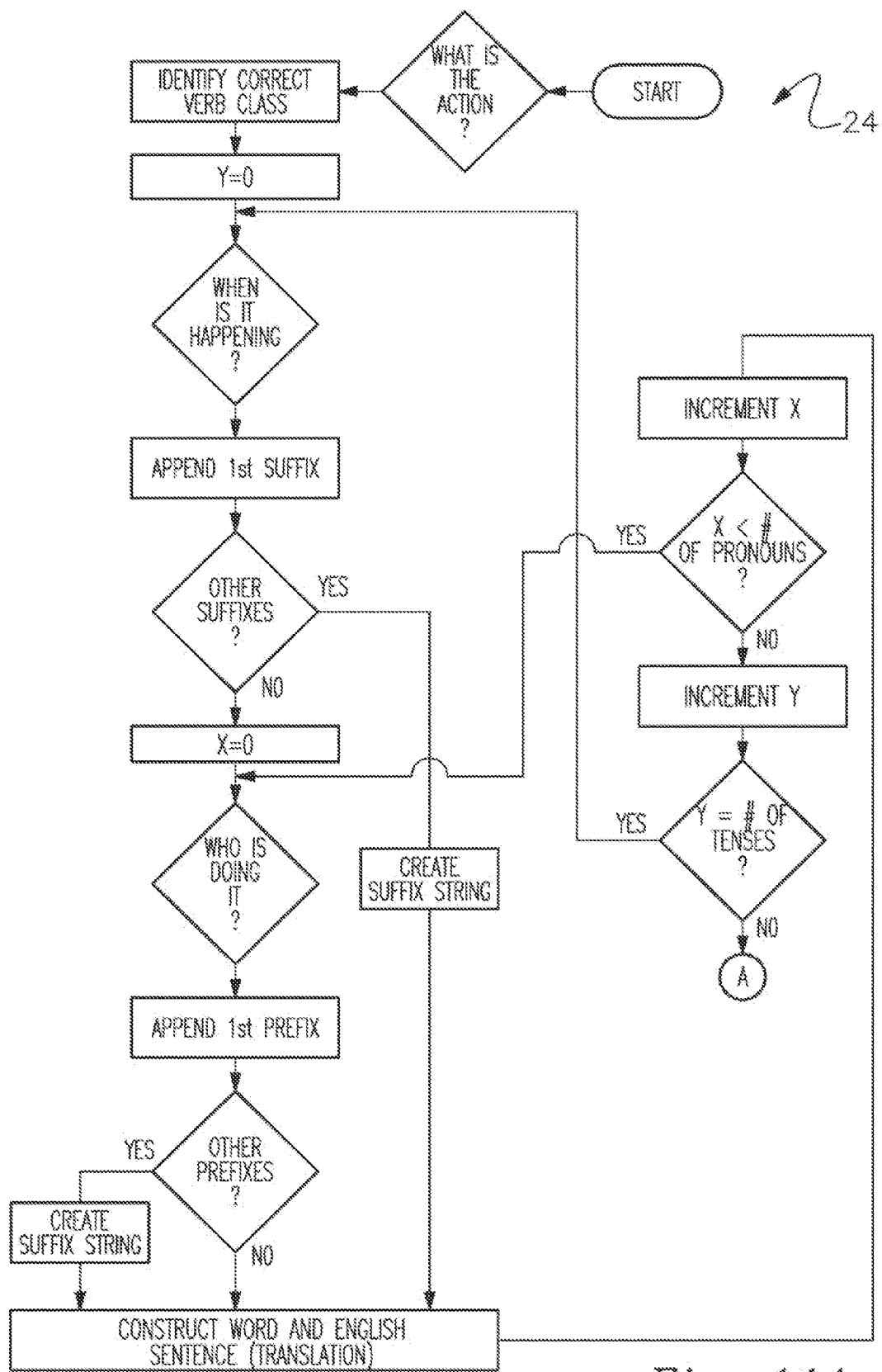
FIGS. 11A and 11B together are a flowchart representing an algorithm or program which constructs all the forms for any one root word (i.e. GO or SPEAK) in a known polysynthetic language for which a parsing reference database already exists.
Figure 11B:
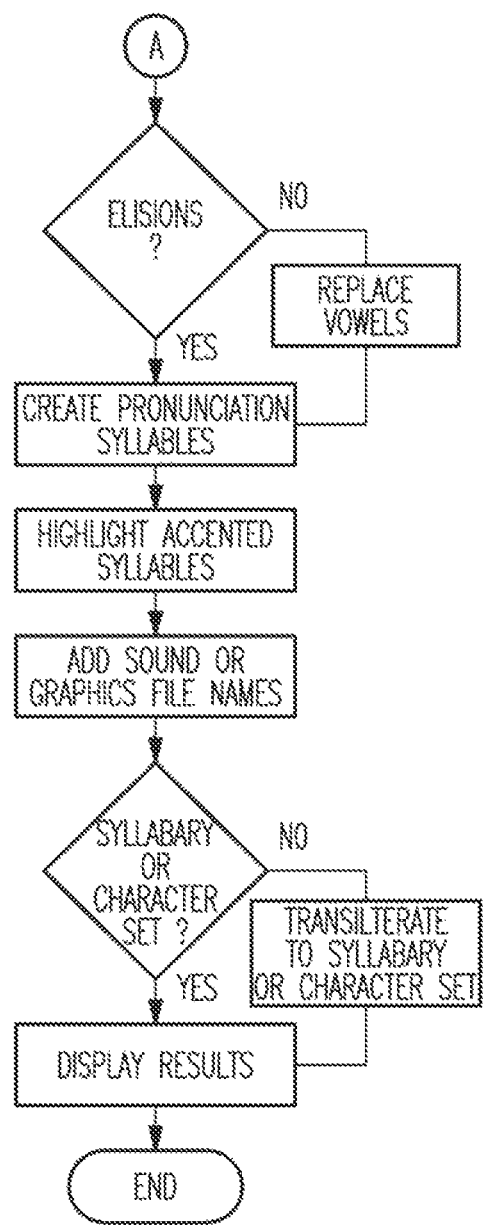

FIGS. 11A and 11B together are a flowchart representing a system 24 or constructor 24 including a computer processor for constructing all the forms for any one root word (i.e. GO or SPEAK) in a known polysynthetic language where a Grandmother Chart already exists. The program of FIGS. 11A and 11B allows a user to choose WHAT the action is, and then generates all the correct forms for that word. As the program executes, it generates the forms for each of the WHO is doing it, times each of the HOW/WHEN it is being done combinations. The output is a list of words, with their English equivalents, pronunciation syllables, syllabary or character set representation of the words, and a list of sound files for each of the syllables, so the user can hear them pronounced. The length of the list is equal to the number of pronouns used in the language times the number of tenses used in the language.

The flowchart of FIGS. 11A and 11B differs from the flowchart of FIG. 5 in that there is a loop where x=possible prefixes and y=possible suffixes, and multiple forms of words are generated in the target polysynthetic language.

In the specific example of FIGS. 11A and 11B, the constructor for all words system 24 is embodied in a program which has all the instructions coded into the program itself. As an alternative, the constructor for all words may be embodied in a program (not shown) which accesses a database containing the appropriate letters or syllables for each individual portion and combines them into the polysynthetic word. The FIG. 11 system 24 and constructor 24 thus references a language parsing reference database, either by instructions coded into a computer program or by access to a separate database, the parsing reference database organized to include polysynthetic word parts WHO is doing an action, WHAT action is being done, HOW an action is happening, and WHEN an action is happening in the polysynthetic language. The system 24 and constructor 24 is operable to accept user input in the user language specifying WHAT action is being done, and to construct and output a list of translated words in the target polysynthetic language including forms for each of the WHO is doing the action for each of the HOW/WHEN the action is being done combinations.

On the following pages are examples of the output of the FIGS. 11A and 11B constructor for all words.

| English Sentence | Part Of Speech | Cherokee Word | Pronunciation | Syllabary |
|---|---|---|---|---|
| I am going | Verb: Present | gega | ge ga | ᎠᏍ |
| You and I are going | Verb: Present | inega | i ne ga | ᎢᏁᎦ |
| We all are going | Verb: Present | idega | i de ga | ᎢᏕᎦ |
| S/he and I are going | Verb: Present | ostega | o ste ga | ᎣᏍᏕᎦ |
| They and I are going | Verb: Present | otsega | o tse ga | ᎣᏨᎦ |
| You (1) are going | Verb: Present | hega | he ga | ᎮᎦ |
| You (2) are going | Verb: Present | istega | i ste ga | ᎢᏍᏕᎦ |
| You all (3+) are going | Verb: Present | itsega | i tse ga | ᎢᏨᎦ |
| S/he or it is going | Verb: Present | ega | e ga | ᎡᎦ |
| They are going | Verb: Present | anega | a ne ga | ᎠᏁᎦ |
| I am about to or just did go | Verb: Command - Immediate | gena | ge na | ᎨᎾ |
| You and I are about to or just did go | Verb: Command - Immediate | inena | i ne na | ᎢᏁᎾ |
| We all are about to or just did go | Verb: Command - Immediate | idena | i de na | ᎢᏕᎾ |
| S/he and I are about to or just did go | Verb: Command - Immediate | ostena | o ste na | ᎣᏍᏖᎾ |
| They and I are about to or just did go | Verb: Command - Immediate | otsena | o tse na | ᎣᏤᎾ |
| You (1) are about to or just did go | Verb: Command - Immediate | hena | he na | ᎮᎾ |
| You (2) are about to or just did go | Verb: Command - Immediate | istena | i ste na | ᎢᏍᏖᎾ |
| You all (3+) are about to or just did go | Verb: Command - Immediate | itsena | i tse na | ᎢᏤᎾ |
| S/he or it is about to or just did go | Verb: Command - Immediate | ena | e na | ᎡᎾ |
| They are about to or just did go | Verb: Command - Immediate | anena | a ne na | ᎠᏁᎾ |

| English Sentence | Part Of Speech | Cherokee Word | Pronunciation | Syllabary |
|---|---|---|---|---|
| I go | Verb: Present - Continually or Habitually | gego`i | ge go `i | ᎨᎪᎢ |
| You and I go | Verb: Present - Continually or Habitually | inego`i | i ne go `i | ᎢᏁᎪᎢ |
| We all go | Verb: Present - Continually or Habitually | idego`i | i de go `i | ᎢᏕᎪᎢ |
| S/he and I go | Verb: Present - Continually or Habitually | ostego`i | o ste go `i | ᎣᏍᏖᎪᎢ |
| They and I go | Verb: Present - Continually or Habitually | otsego`i | o tse go `i | ᎣᏤᎪᎢ |
| You (1) go | Verb: Present - Continually or Habitually | hego`i | he go `i | ᎮᎪᎢ |
| You (2) go | Verb: Present - Continually or Habitually | istego`i | i ste go `i | ᎢᏍᏖᎪᎢ |
| You all (3+) go | Verb: Present - Continually or Habitually | itsego`i | i tse go `i | ᎢᏤᎪᎢ |
| S/he or it go | Verb: Present - Continually or Habitually | ego`i | e go `i | ᎡᎪᎢ |
| They go | Verb: Present - Continually or Habitually | anego`i | a ne go `i | ᎠᏁᎪᎢ |
| I will be going | Verb: Future - Continually or Habitually | gegesdi | ge ge sdi | ᎨᎨᏍᏗ |
| You and I will be going | Verb: Future - Continually or Habitually | inegesdi | i ne ge sdi | ᎢᏁᎨᏍᏗ |
| We all will be going | Verb: Future - Continually or Habitually | idegesdi | i de ge sdi | ᎢᏕᎨᏍᏗ |
| S/he and I will be going | Verb: Future - Continually or Habitually | ostegesdi | o ste ge sdi | ᎣᏍᏖᎨᏍᏗ |
| They and I will be going | Verb: Future - Continually or Habitually | otsegesdi | o tse ge sdi | ᎣᏤᎨᏍᏗ |
| You (1) will be going | Verb: Future - Continually or Habitually | hegesdi | he ge sdi | ᎮᎨᏍᏗ |
| You (2) will be going | Verb: Future - Continually or Habitually | istegesdi | i ste ge sdi | ᎢᏍᏖᎨᏍᏗ |
| You all (3+) will be going | Verb: Future - Continually or Habitually | itsegesdi | i tse ge sdi | ᎢᏤᎨᏍᏗ |
| S/he or it will be going | Verb: Future - Continually or Habitually | egesdi | e ge sdi | ᎡᎨᏍᏗ |
| They will be going | Verb: Future - Continually or Habitually | anegesdi | a ne ge sdi | ᎠᏁᎨᏍᏗ |
| I was going | Verb: Past - Continually or Habitually | gegv`i | ge gv i | ᎨᎬᎢ |
| You and I were going | Verb: Past - Continually or Habitually | inegv`i | i ne gv i | ᎢᏁᎬᎢ |
| We all were going | Verb: Past - Continually or Habitually | idegv`i | i de gv i | ᎢᏕᎬᎢ |
| S/he and I were going | Verb: Past - Continually or Habitually | ostegv`i | o ste gv i | ᎣᏍᏖᎬᎢ |
| They and I were going | Verb: Past - Continually or Habitually | otsegv`i | o tse gv i | ᎣᏤᎬᎢ |
| You (1) were going | Verb: Past - Continually or Habitually | hegv`i | he gv i | ᎮᎬᎢ |
| You (2) were going | Verb: Past - Continually or Habitually | istegv`i | i ste gv i | ᎢᏍᏖᎬᎢ |
| You all (3+) were going | Verb: Past - Continually or Habitually | itsegv`i | i tse gv i | ᎢᏤᎬᎢ |
| S/he or it was going | Verb: Past - Continually or Habitually | egv`i | e gv i | ᎡᎬᎢ |
| They were going | Verb: Past - Continually or Habitually | anegv`i | a ne gv i | ᎠᏁᎬᎢ |
| I was going definitely | Verb: Past - Continually or Habitually - It definitely happened | gegvgi | ge gv gi | ᎨᎬᎩ |
| You and I were going definitely | Verb: Past - Continually or Habitually - It definitely happened | inegvgi | i ne gv gi | ᎢᏁᎬᎩ |
| We all were going definitely | Verb: Past - Continually or Habitually - It definitely happened | idegvgi | i de gv gi | ᎢᏕᎬᎩ |
| S/he and I were going definitely | Verb: Past - Continually or Habitually - It definitely happened | ostegvgi | o ste gv gi | ᎣᏍᏖᎬᎩ |
| They and I were going definitely | Verb: Past - Continually or Habitually - It definitely happened | otsegvgi | o tse gv gi | ᎣᏤᎬᎩ |

-continued

| English Sentence | Part Of Speech | Cherokee Word | Pronunciation | Syllabary |
|---|---|---|---|---|
| You (1) were going definitely | Verb: Past - Continually or Habitually - It definitely happened | hegvgi | he gv gi | ᎮᎬᎩ |
| You (2) were going definitely | Verb: Past - Continually or Habitually - It definitely happened | istegvgi | i ste gv gi | ᎢᏍᏖᎬᎩ |
| You all (3+) were going definitely | Verb: Past - Continually or Habitually - It definitely happened | itsegvgi | i tse gv gi | ᎢᏤᎬᎩ |
| S/he or it was going definitely | Verb: Past-Continually or Habitually - It definitely happened | egvgi | e gv gi | ᎡᎬᎩ |
| They were going definitely | Verb: Past - Continually or Habitually - It definitely happened | anegvgi | a ne gv gi | ᎠᏁᎬᎩ |
| I was going reportedly | Verb: Past - Continually or Habitually - It reportedly happened | gege`i | ge ge i | ᎨᎨᎢ |
| You and I were going reportedly | Verb: Past - Continually or Habitually - It reportedly happened | inege`i | i ne ge i | ᎢᏁᎨᎢ |
| We all were going reportedly | Verb: Past - Continually or Habitually - It reportedly happened | idege`i | i de ge i | ᎢᏕᎨᎢ |
| S/he and I were going reportedly | Verb: Past - Continually or Habitually - It reportedly happened | ostege`i | o ste ge i | ᎣᏍᏖᎨᎢ |
| They and I were going reportedly | Verb: Past - Continually or Habitually - It reportedly happened | otsege`i | o tse ge i | ᎣᏤᎨᎢ |
| You (1) were going reportedly | Verb: Past - Continually or Habitually - It reportedly happened | hege`i | he ge i | ᎮᎨᎢ |
| You (2) were going reportedly | Verb: Past - Continually or Habitually - It reportedly happened | istege`i | i ste ge i | ᎢᏍᏖᎨᎢ |
| You all (3+) were going reportedly | Verb: Past - Continually or Habitually - It reportedly happened | itsege`i | i tse ge i | ᎢᏤᎨᎢ |
| S/he or it was going reportedly | Verb: Past - Continually or Habitually - It reportedly happened | ege`i | e ge i | ᎡᎨᎢ |
| They were going reportedly | Verb: Past - Continually or Habitually - It reportedly happened | anege`i | a ne ge i | ᎠᏁᎨᎢ |
| I will go | Verb: Future - One point in time | dagesi | da ge si | ᏓᎨᏏ |
| You and I will go | Verb: Future - One point in time | dinesi | di ne si | ᏗᏁᏏ |
| We all will go | Verb: Future - One point in time | didesi | di de si | ᏗᏕᏏ |
| S/he and I will go | Verb: Future - One point in time | dostesi | do ste si | ᏙᏍᏖᏏ |
| They and I will go | Verb: Future - One point in time | dotsesi | do tse si | ᏙᏤᏏ |
| You (1) will go | Verb: Future - One point in time | tesi | te si | ᏖᏏ |
| You (2) will go | Verb: Future - One point in time | distesi | di ste si | ᏗᏍᏖᏏ |
| You all (3+) will go | Verb: Future - One point in time | ditsesi | di tse si | ᏗᏤᏏ |
| S/he or it will go | Verb: Future - One point in time | dayesi | da ye si | ᏓᏰᏏ |
| They will go | Verb: Future - One point in time | dvnesi | dv ne si | ᏛᏁᏏ |
| I went | Verb: Past - One point in time | agwenvsv`i | a gwe nv sv i | ᎠᏊᏅᏒᎢ |
| You and I went | Verb: Past - One point in time | ginenvsv`i | gi ne nv sv i | ᎩᏁᏅᏒᎢ |
| We all went | Verb: Past - One point in time | igenvsv`i | i ge nv sv i | ᎢᎨᏅᏒᎢ |
| S/he and I went | Verb: Past - One point in time | oginenvsv`i | o gi ne nv sv i | ᎣᎩᏁᏅᏒᎢ |
| They and I went | Verb: Past - One point in time | ogenvsv`i | o ge nv sv i | ᎣᎨᏅᏒᎢ |

-continued

| English Sentence | Part Of Speech | Cherokee Word | Pronunciation | Syllabary |
|---|---|---|---|---|
| You (1) went | Verb: Past - One point in time | tsenvsv`i | tse nv sv i | ᏤᏅᏒᎢ |
| You (2) went | Verb: Past - One point in time | stenvsv`i | ste nv sv i | ᏍᏕᏅᏒᎢ |
| You all (3+) went | Verb: Past - One point in time | itsenvsv`i | i tse nv sv i | ᎢᏤᏅᏒᎢ |
| S/he or it went | Verb: Past - One point in time | uwenvsv`i | u we nv sv i | ᎤᏪᏅᏒᎢ |
| They went | Verb: Past - One point in time | unenvsv`i | u ne nv sv i | ᎤᏁᏅᏒᎢ |
| I went definitely | Verb: Past - One point in time - It definitely happened | agwenvsvgi | a gwe nv sv gi | ᎠᏆᏅᏒᏀ |
| You and I went definitely | Verb: Past - One point in time - It definitely happened | ginenvsvgi | gi ne nv sv gi | ᎩᏁᏅᏒᏀ |
| We all went definitely | Verb: Past - One point in time - It definitely happened | igenvsvgi | i ge nv sv gi | ᎢᎨᏅᏒᏀ |
| S/he and I went definitely | Verb: Past - One point in time - It definitely happened | oginenvsvgi | o gi ne nv sv gi | ᎣᎩᏁᏅᏒᏀ |
| They and I went definitely | Verb: Past - One point in time - It definitely happened | ogenvsvgi | o ge nv sv gi | ᎣᎨᏅᏒᏀ |
| You (1) went definitely | Verb: Past - One point in time - It definitely happened | tsenvsvgi | tse nv sv gi | ᏤᏅᏒᏀ |
| You (2) went definitely | Verb: Past - One point in time - It definitely happened | stenvsvgi | ste nv sv gi | ᏍᏕᏅᏒᏀ |
| You all (3+) went definitely | Verb: Past - One point in time - It definitely happened | itsenvsvgi | i tse nv sv gi | ᎢᏤᏅᏒᏀ |
| S/he or it went definitely | Verb: Past - One point in time - It definitely happened | uwenvsvgi | u we nv sv gi | ᎤᏪᏅᏒᏀ |
| They went definitely | Verb: Past - One point in time - It definitely happened | unenvsvgi | u ne nv sv gi | ᎤᏁᏅᏒᏀ |
| I went reportedly | Verb: Past - One point in time - It reportedly happened | agwenvse`i | a gwe nv se i | ᎠᏆᏅᏎᎢ |
| You and I went reportedly | Verb: Past - One point in time - It reportedly happened | ginenvse`i | gi ne nv se i | ᎩᏁᏅᏎᎢ |
| We all went reportedly | Verb: Past - One point in time - It reportedly happened | igenvse`i | i ge nv se i | ᎢᎨᏅᏎᎢ |
| S/he and I went reportedly | Verb: Past - One point in time - It reportedly happened | oginenvse`i | o gi ne nv se i | ᎣᎩᏁᏅᏎᎢ |
| They and I went reportedly | Verb: Past - One point in time - It reportedly happened | ogenvse`i | o ge nv se i | ᎣᎨᏅᏎᎢ |
| You (1) went reportedly | Verb: Past - One point in time - It reportedly happened | tsenvse`i | tse nv se i | ᏤᏅᏎᎢ |
| You (2) went reportedly | Verb: Past - One point in time - It reportedly happened | stenvse`i | ste nv se i | ᏍᏕᏅᏎᎢ |
| You all (3+) went reportedly | Verb: Past - One point in time - It reportedly happened | itsenvse`i | i tse nv se i | ᎢᏤᏅᏎᎢ |
| S/he or it went reportedly | Verb: Past - One point in time - It reportedly happened | uwenvse`i | u we nv se i | ᎤᏪᏅᏎᎢ |
| They went reportedly | Verb: Past - One point in time - It reportedly happened | unenvse`i | u ne nv se i | ᎤᏁᏅᏎᎢ |
| I to go | Verb: Infinitive - To do it | agwenvsdi | a gwe nv sdi | ᎠᏆᏅᏍᏗ |
| You and I to go | Verb: Infinitive - To do it | ginenvsdi | gi ne nv sdi | ᎩᏁᏅᏍᏗ |
| We all to go | Verb: Infinitive - To do it | igenvsdi | i ge nv sdi | ᎢᎨᏅᏍᏗ |
| S/he and I to go | Verb: Infinitive - To do it | oginenvsdi | o gi ne nv sdi | ᎣᎩᏁᏅᏍᏗ |
| They and I to go | Verb: Infinitive - To do it | ogenvsdi | o ge nv sdi | ᎣᎨᏅᏍᏗ |
| You (1) to go | Verb: Infinitive - To do it | tsenvsdi | tse nv sdi | ᏤᏅᏍᏗ |
| You (2) to go | Verb: Infinitive - To do it | stenvsdi | ste nv sdi | ᏍᏕᏅᏍᏗ |
| You all (3+) to go | Verb: Infinitive - To do it | itsenvsdi | i tse nv sdi | ᎢᏤᏅᏍᏗ |
| S/he or it to go | Verb: Infinitive - To do it | uwenvsdi | u we nv sdi | ᎤᏪᏅᏍᏗ |
| They to go | Verb: Infinitive - To do it | unenvsdi | u ne nv sdi | ᎤᏁᏅᏍᏗ |
| I am not going | Verb: Present | gesdiyigega | ge sdi yi ge ga | ᎨᏍᏗᏱᎨᎦ |
| You and I are not going | Verb: Present | gesdiyinega | ge sdi yi ne ga | ᎨᏍᏗᏱᏁᎦ |

-continued

| English Sentence | Part Of Speech | Cherokee Word | Pronunciation | Syllabary |
|---|---|---|---|---|
| We all are not going | Verb: Present | gesdiyidega | ge sdi yi de ga | ᎨᏍᏗᏱᏕᎦ |
| S/he and I are not going | Verb: Present | gesdiyostega | ge sdi yo ste ga | ᎨᏍᏗᏲᏍᏖᎦ |
| They and I are not going | Verb: Present | gesdiyotsega | ge sdi yo tse ga | ᎨᏍᏗᏲᏤᎦ |
| You (1) are not going | Verb: Present | gesdiyihega | ge sdi yi he ga | ᎨᏍᏗᏱᎮᎦ |
| You (2) are not going | Verb: Present | gesdiyistega | ge sdi yi ste ga | ᎨᏍᏗᏱᏍᏖᎦ |
| You all (3+) are not going | Verb: Present | gesdiyitsega | ge sdi yi tse ga | ᎨᏍᏗᏱᏤᎦ |
| S/he or it is not going | Verb: Present | gesdiyega | ge sdi ye ga | ᎨᏍᏗᏰᎦ |
| They are not going | Verb: Present | gesdiyanega | ge sdi ya ne ga | ᎨᏍᏗᏯᏁᎦ |
| I am about to or just did not go | Verb: Command - Immediate | gesdiyigena | ge sdi yi ge na | ᎨᏍᏗᏱᎨᎾ |
| You and I are about to or just did not go | Verb: Command - Immediate | gesdiyinena | ge sdi yi ne na | ᎨᏍᏗᏱᏁᎾ |
| We all are about to or just did not go | Verb: Command - Immediate | gesdiyidena | ge sdi yi de na | ᎨᏍᏗᏱᏕᎾ |
| S/he and I are about to or just did not go | Verb: Command - Immediate | gesdiyostena | ge sdi yo ste na | ᎨᏍᏗᏲᏍᏖᎾ |
| They and I are about to or just did not go | Verb: Command - Immediate | gesdiyotsena | ge sdi yo tse na | ᎨᏍᏗᏲᏤᎾ |
| You (1) are about to or just did not go | Verb: Command - Immediate | gesdiyihena | ge sdi yi he na | ᎨᏍᏗᏱᎮᎾ |
| You (2) are about to or just did not go | Verb: Command - Immediate | gesdiyistena | ge sdi yi ste na | ᎨᏍᏗᏱᏍᏖᎾ |
| You all (3+) are about to or just did not go | Verb: Command - Immediate | gesdiyitsena | ge sdi yi tse na | ᎨᏍᏗᏱᏤᎾ |
| S/he or it is about to or just did not go | Verb: Command - Immediate | gesdiyena | ge sdi ye na | ᎨᏍᏗᏰᎾ |
| They are about to or just did not go | Verb: Command - Immediate | gesdiyanena | ge sdi ya ne na | ᎨᏍᏗᏯᏁᎾ |
| I do not go | Verb: Present - Continually or Habitually | gesdiyigego`i | ge sdi yi ge go `i | ᎨᏍᏗᏱᎨᎪᎢ |
| You and I do not go | Verb: Present - Continually or Habitually | gesdiyinego`i | ge sdi yi ne go `i | ᎨᏍᏗᏱᏁᎪᎢ |
| We all do not go | Verb: Present - Continually or Habitually | gesdiyidego`i | ge sdi yi de go `i | ᎨᏍᏗᏱᏕᎪᎢ |
| S/he and I do not go | Verb: Present - Continually or Habitually | gesdiyostego`i | ge sdi yo ste go `i | ᎨᏍᏗᏲᏍᏖᎪᎢ |
| They and I do not go | Verb: Present - Continually or Habitually | gesdiyotsego`i | ge sdi yo tse go `i | ᎨᏍᏗᏲᏤᎪᎢ |
| You (1) do not go | Verb: Present - Continually or Habitually | gesdiyihego`i | ge sdi yi he go `i | ᎨᏍᏗᏱᎮᎪᎢ |
| You (2) do not go | Verb: Present - Continually or Habitually | gesdiyistego`i | ge sdi yi ste go `i | ᎨᏍᏗᏱᏍᏖᎪᎢ |
| You all (3+) do not go | Verb: Present - Continually or Habitually | gesdiyitsego`i | ge sdi yi tse go `i | ᎨᏍᏗᏱᏤᎪᎢ |
| S/he or it do not go | Verb: Present - Continually or Habitually | gesdiyego`i | ge sdi ye go `i | ᎨᏍᏗᏰᎪᎢ |
| They do not go | Verb: Present - Continually or Habitually | gesdiyanego`i | ge sdi ya ne go `i | ᎨᏍᏗᏯᏁᎪᎢ |
| I will not be going | Verb: Future - Continually or Habitually | gesdiyigegesdi | ge sdi yi ge ge sdi | ᎨᏍᏗᏱᎨᎨᏍᏗ |
| You and I will not be going | Verb: Future - Continually or Habitually | gesdiyinegesdi | ge sdi yi ne ge sdi | ᎨᏍᏗᏱᏁᎨᏍᏗ |
| We all will not be going | Verb: Future - Continually or Habitually | gesdiyidegesdi | ge sdi yi de ge sdi | ᎨᏍᏗᏱᏕᎨᏍᏗ |
| S/he and I will not be going | Verb: Future - Continually or Habitually | gesdiyostegesdi | ge sdi yo ste ge sdi | ᎨᏍᏗᏲᏍᏖᎨᏍᏗ |

-continued

| English Sentence | Part Of Speech | Cherokee Word | Pronunciation | Syllabary |
|---|---|---|---|---|
| They and I will not be going | Verb: Future - Continually or Habitually | gesdiyotsegesdi | ge sdi yo tse ge sdi | ᎬᏍᏗᏲᏤᎨᏍᏗ |
| You (1) will not be going | Verb: Future - Continually or Habitually | gesdiyihegesdi | ge sdi yi he ge sdi | ᎬᏍᏗᏱᎮᎨᏍᏗ |
| You (2) will be not going | Verb: Future - Continually or Habitually | gesdiyistegesdi | ge sdi yi ste ge sdi | ᎬᏍᏗᏱᏍᏖᎨᏍᏗ |
| You all (3+) will be not going | Verb: Future - Continually or Habitually | gesdiyitsegesdi | ge sdi yi tse ge sdi | ᎬᏍᏗᏱᏤᎨᏍᏗ |
| S/he or it will be not going | Verb: Future - Continually or Habitually | gesdiyegesdi | ge sdi ye ge sdi | ᎬᏍᏗᏰᎨᏍᏗ |
| They will be not going | Verb: Future - Continually or Habitually | gesdiyanegesdi | ge sdi ya ne ge sdi | ᎬᏍᏗᏯᏁᎨᏍᏗ |
| I was not going | Verb: Past - Continually or Habitually | gesdiyigegv`i | ge sdi yi ge gv i | ᎬᏍᏗᏱᎨᎬᎢ |
| You and I were not going | Verb: Past - Continually or Habitually | gesdiyinegv`i | ge sdi yi ne gv i | ᎬᏍᏗᏱᏁᎬᎢ |
| We all were not going | Verb: Past - Continually or Habitually | gesdiyidegv`i | ge sdi yi de gv i | ᎬᏍᏗᏱᏕᎬᎢ |
| S/he and I were not going | Verb: Past - Continually or Habitually | gesdiyostegv`i | ge sdi yo ste gv i | ᎬᏍᏗᏲᏍᏖᎬᎢ |
| They and I were not going | Verb: Past - Continually or Habitually | gesdiyotsegv`i | ge sdi yo tse gv i | ᎬᏍᏗᏲᏤᎬᎢ |
| You (1) were not going | Verb: Past - Continually or Habitually | gesdiyihegv`i | ge sdi yi he gv i | ᎬᏍᏗᏱᎮᎬᎢ |
| You (2) were not going | Verb: Past- Continually or Habitually | gesdiyistegv`i | ge sdi yi ste gv i | ᎬᏍᏗᏱᏍᏖᎬᎢ |
| You all (3+) were not going | Verb: Past - Continually or Habitually | gesdiyitsegv`i | ge sdi yi tse gv i | ᎬᏍᏗᏱᏤᎬᎢ |
| S/he or it was not going | Verb: Past - Continually or Habitually | gesdiyegv`i | ge sdi ye gv i | ᎬᏍᏗᏰᎬᎢ |
| They were not going | Verb: Past - Continually or Habitually | gesdiyanegv`i | ge sdi ya ne gv i | ᎬᏍᏗᏯᏁᎬᎢ |
| I was not going definitely | Verb: Past - Continually or Habitually - It definitely happened | gesdiyigegvgi | ge sdi yi ge gv gi | ᎬᏍᏗᏱᎨᎬᎩ |
| You and I were not going definitely | Verb: Past - Continually or Habitually - It definitely happened | gesdiyinegvgi | ge sdi yi ne gv gi | ᎬᏍᏗᏱᏁᎬᎩ |
| We all were not going definitely | Verb: Past - Continually or Habitually - It definitely happened | gesdiyidegvgi | ge sdi yi de gv gi | ᎬᏍᏗᏱᏕᎬᎩ |
| S/he and I were not going definitely | Verb: Past- Continually or Habitually - It definitely happened | gesdiyostegvgi | ge sdi yo ste gv gi | ᎬᏍᏗᏲᏍᏖᎬᎩ |
| They and I were not going definitely | Verb: Past - Continually or Habitually - It definitely happened | gesdiyotsegvgi | ge sdi yo tse gv gi | ᎬᏍᏗᏲᏤᎬᎩ |
| You (1) were not going definitely | Verb: Past - Continually or Habitually - It definitely happened | gesdiyihegvgi | ge sdi yi he gv gi | ᎬᏍᏗᏱᎮᎬᎩ |

-continued

| English Sentence | Part Of Speech | Cherokee Word | Pronunciation | Syllabary |
|---|---|---|---|---|
| You (2) were not going definitely | Verb: Past - Continually or Habitually - It definitely happened | gesdiyistegvgi | ge sdi yi ste gv gi | ᎬᏍᏗᏱᏍᏕᎬᎩ |
| You all (3+) were not going definitely | Verb: Past - Continually or Habitually - It definitely happened | gesdiyitsegvgi | ge sdi yi tse gv gi | ᎬᏍᏗᏱᏤᎬᎩ |
| S/he or it was not going definitely | Verb: Past - Continually or Habitually - It definitely happened | gesdiyegvgi | ge sdi ye gv gi | ᎬᏍᏗᏰᎬᎩ |
| They were not going definitely | Verb: Past - Continually or Habitually - It definitely happened | gesdiyanegvgi | ge sdi ya ne gv gi | ᎬᏍᏗᏯᏁᎬᎩ |
| I was not going reportedly | Verb: Past - Continually or Habitually - It reportedly happened | gesdiyigege`i | ge sdi yi ge ge i | ᎬᏍᏗᏱᎨᎨᎢ |
| You and I were not going reportedly | Verb: Past - Continually or Habitually - It reportedly happened | gesdiyinege`i | ge sdi yi ne ge i | ᎬᏍᏗᏱᏁᎨᎢ |
| We all were not going reportedly | Verb: Past - Continually or Habitually - It reportedly happened | gesdiyidege`i | ge sdi yi de ge i | ᎬᏍᏗᏱᏕᎨᎢ |
| S/he and I were not going reportedly | Verb: Past - Continually or Habitually - It reportedly happened | gesdiyostege`i | ge sdi yo ste ge i | ᎬᏍᏗᏲᏍᏕᎨᎢ |
| They and I were not going reportedly | Verb: Past - Continually or Habitually - It reportedly happened | gesdiyotsege`i | ge sdi yo tse ge i | ᎬᏍᏗᏲᏤᎨᎢ |
| You (1) were not going reportedly | Verb: Past - Continually or Habitually - It reportedly happened | gesdiyihege`i | ge sdi yi he ge i | ᎬᏍᏗᏱᎮᎨᎢ |
| You (2) were not going reportedly | Verb: Past - Continually or Habitually - It reportedly happened | gesdiyistege`i | ge sdi yi ste ge i | ᎬᏍᏗᏱᏍᏕᎨᎢ |
| You all (3+) were not going reportedly | Verb: Past - Continually or Habitually - It reportedly happened | gesdiyitsege`i | ge sdi yi tse ge i | ᎬᏍᏗᏱᏤᎨᎢ |
| S/he or it was not going reportedly | Verb: Past - Continually or Habitually-It reportedly happened | gesdiyege`i | ge sdi ye ge i | ᎬᏍᏗᏰᎨᎢ |
| They were not going reportedly | Verb: Past - Continually or Habitually-It reportedly happened | gesdiyanege`i | ge sdi ya ne ge i | ᎬᏍᏗᏯᏁᎨᎢ |
| I will not go | Verb: Future - One point in time | gesdiyidagesi | ge sdi yi da ge si | ᎬᏍᏗᏱᏓᎨᏏ |
| You and I will not go | Verb: Future - One point in time | gesdiyidinesi | ge sdi yi di ne si | ᎬᏍᏗᏱᏗᏁᏏ |
| We all will not go | Verb: Future - One point in time | gesdiyididesi | ge sdi yi di de si | ᎬᏍᏗᏱᏗᏕᏏ |
| S/he and I will not go | Verb: Future - One point in time | gesdiyidostesi | ge sdi yi do ste si | ᎬᏍᏗᏱᏙᏍᏖᏏ |
| They and I will not go | Verb: Future - One point in time | gesdiyidotsesi | ge sdi yi do tse si | ᎬᏍᏗᏱᏙᏨᏏ |
| You (1) will not go | Verb: Future - One point in time | gesdiyitesi | ge sdi yi te si | ᎬᏍᏗᏱᏖᏏ |
| You (2) will not go | Verb: Future - One point in time | gesdiyidistesi | ge sdi yi di ste si | ᎬᏍᏗᏱᏗᏍᏖᏏ |
| You all (3+) will not go | Verb: Future - One point in time | gesdiyiditsesi | ge sdi yi di tse si | ᎬᏍᏗᏱᏗᏨᏏ |
| S/he or it will not go | Verb: Future - One point in time | gesdiyidayesi | ge sdi yi da ye si | ᎬᏍᏗᏱᏓᏰᏏ |

-continued

| English Sentence | Part Of Speech | Cherokee Word | Pronunciation | Syllabary |
|---|---|---|---|---|
| They will not go | Verb: Future - One point in time | gesdiyidvnesi | ge sdi yi dv ne si | ᎨᏍᏗᏱᏛᏁᏏ |
| I did not go | Verb: Past - One point in time | gesdiyagwenvsv`i | ge sdi ya gwe nv sv i | ᎨᏍᏗᏯᏇᏅᏒᎢ |
| You and I did not go | Verb: Past - One point in time | gesdiyiginenvsv`i | ge sdi yi gi ne nv sv i | ᎨᏍᏗᏱᎩᏁᏅᏒᎢ |
| We all did not go | Verb: Past - One point in time | gesdiyigenvsv`i | ge sdi yi ge nv sv i | ᎨᏍᏗᏱᎨᏅᏒᎢ |
| S/he and I did not go | Verb: Past - One point in time | gesdiyoginenvsv`i | ge sdi yo gi ne nv sv i | ᎨᏍᏗᎩᏁᏅᏒᎢ |
| They and I did not go | Verb: Past - One point in time | gesdiyogenvsv`i | ge sdi yo ge nv sv i | ᎨᏍᏗᎩᎨᏅᏒᎢ |
| You (1) did not go | Verb: Past - One point in time | gesdiyitsenvsv`i | ge sdi yi tse nv sv i | ᎨᏍᏗᏱᏤᏅᏒᎢ |
| You (2) did not go | Verb: Past - One point in time | gesdiyistenvsv`i | ge sdi yi ste nv sv i | ᎨᏍᏗᏱᏍᏖᏅᏒᎢ |
| You all (3+) did not go | Verb: Past - One point in time | gesdiyitsenvsv`i | ge sdi yi tse nv sv i | ᎨᏍᏗᏱᏤᏅᏒᎢ |
| S/he or it did not go | Verb: Past - One point in time | gesdiyuwenvsv`i | ge sdi yu we nv sv i | ᎨᏍᏗᏳᏪᏅᏒᎢ |
| They did not go | Verb: Past - One point in time | gesdiyunenvsv`i | ge sdi yu ne nv sv i | ᎨᏍᏗᏳᏁᏅᏒᎢ |
| I did not go definitely | Verb: Past - One point in time - It definitely happened | gesdiyagwenvsvgi | ge sdi ya gwe nv sv gi | ᎨᏍᏗᏯᏇᏅᏒᎩ |
| You and I did not go definitely | Verb: Past - One point in time - It definitely happened | gesdiyiginenvsvgi | ge sdi yi gi ne nv sv gi | ᎨᏍᏗᏱᎩᏁᏅᏒᎩ |
| We all did not go definitely | Verb: Past - One point in time - It definitely happened | gesdiyigenvsvgi | ge sdi yi ge nv sv gi | ᎨᏍᏗᏱᎨᏅᏒᎩ |
| S/he and I did not go definitely | Verb: Past - One point in time - It definitely happened | gesdiyoginenvsvgi | ge sdi yo gi ne nv sv gi | ᎨᏍᏗᎩᏁᏅᏒᎩ |
| They and I did not go definitely | Verb: Past - One point in time - It definitely happened | gesdiyogenvsvgi | ge sdi yo ge nv sv gi | ᎨᏍᏗᎩᎨᏅᏒᎩ |
| You (1) did not go definitely | Verb: Past - One point in time - It definitely happened | gesdiyitsenvsvgi | ge sdi yi tse nv sv gi | ᎨᏍᏗᏱᏤᏅᏒᎩ |
| You (2) did not go definitely | Verb: Past - One point in time - It definitely happened | gesdiyistenvsvgi | ge sdi yi ste nv sv gi | ᎨᏍᏗᏱᏍᏖᏅᏒᎩ |
| You all (3+) did not go definitely | Verb: Past - One point in time - It definitely happened | gesdiyitsenvsvgi | ge sdi yi tse nv sv gi | ᎨᏍᏗᏱᏤᏅᏒᎩ |
| S/he or it did not go definitely | Verb: Past - One point in time - It definitely happened | gesdiyuwenvsvgi | ge sdi yu we nv sv gi | ᎨᏍᏗᏳᏪᏅᏒᎩ |
| They did not go definitely | Verb: Past - One point in time - It definitely happened | gesdiyunenvsvgi | ge sdi yu ne nv sv gi | ᎨᏍᏗᏳᏁᏅᏒᎩ |
| I did not go reportedly | Verb: Past - One point in time - It reportedly happened | gesdiyagwenvse`i | ge sdi ya gwe nv se i | ᎨᏍᏗᏯᏇᏅᏎᎢ |
| You and I did not go reportedly | Verb: Past - One point in time - It reportedly happened | gesdiyiginenvse`i | ge sdi yi gi ne nv se i | ᎨᏍᏗᏱᎩᏁᏅᏎᎢ |
| We all did not go reportedly | Verb: Past - One point in time - It reportedly happened | gesdiyigenvse`i | ge sdi yi ge nv se i | ᎨᏍᏗᏱᎨᏅᏎᎢ |
| S/he and I did not go reportedly | Verb: Past - One point in time - It reportedly happened | gesdiyoginenvse`i | ge sdi yo gi ne nv se i | ᎨᏍᏗᎩᏁᏅᏎᎢ |
| They and I did not go reportedly | Verb: Past - One point in time - It reportedly happened | gesdiyogenvse`i | ge sdi yo ge nv se i | ᎨᏍᏗᎩᎨᏅᏎᎢ |
| You (1) did not go reportedly | Verb: Past - One point in time - It reportedly happened | gesdiyitsenvse`i | ge sdi yi tse nv se i | ᎨᏍᏗᏱᏤᏅᏎᎢ |
| You (2) did not go reportedly | Verb: Past - One point in time - It reportedly happened | gesdiyistenvse`i | ge sdi yi ste nv se i | ᎨᏍᏗᏱᏍᏖᏅᏎᎢ |

-continued

| English Sentence | Part Of Speech | Cherokee Word | Pronunciation | Syllabary |
|---|---|---|---|---|
| You all (3+) did not go reportedly | Verb: Past - One point in time - It reportedly happened | gesdiyitsenvse`i | ge sdi yi tse nv se i | ᎨᏍᏗᏱᏦᏅᏎᎢ |
| S/he or it did not go reportedly | Verb: Past - One point in time - It reportedly happened | gesdiyuwenvse`i | ge sdi yu we nv se i | ᎨᏍᏗᏳᏪᏅᏎᎢ |
| They did not go reportedly | Verb: Past - One point in time - It reportedly happened | gesdiyunenvse`i | ge sdi yu ne nv se i | ᎨᏍᏗᏳᏁᏅᏎᎢ |
| I not to go | Verb: Infinitive - To do it | gesdiyagwenvsdi | ge sdi ya gwe nv sdi | ᎨᏍᏗᏯᏆᏅᏍᏗ |
| You and I not to go | Verb: Infinitive - To do it | gesdiyiginenvsdi | ge sdi yi gi ne nv sdi | ᎨᏍᏗᏱᎩᏁᏅᏍᏗ |
| We all not to go | Verb: Infinitive - To do it | gesdiyigenvsdi | ge sdi yi ge nv sdi | ᎨᏍᏗᏱᎨᏅᏍᏗ |
| S/he and I not to go | Verb: Infinitive - To do it | gesdiyoginenvsdi | ge sdi yo gi ne nv sdi | ᎨᏍᏗᏲᎩᏁᏅᏍᏗ |
| They and I not to go | Verb: Infinitive - To do it | gesdiyogenvsdi | ge sdi yo ge nv sdi | ᎨᏍᏗᏲᎨᏅᏍᏗ |
| You (1) not to go | Verb: Infinitive - To do it | gesdiyitsenvsdi | ge sdi yi tse nv sdi | ᎨᏍᏗᏱᏦᏅᏍᏗ |
| You (2) not to go | Verb: Infinitive - To do it | gesdiyistenvsdi | ge sdi yi ste nv sdi | ᎨᏍᏗᏱᏍᏔᏅᏍᏗ |
| You all (3+) not to go | Verb: Infinitive - To do it | gesdiyitsenvsdi | ge sdi yi tse nv sdi | ᎨᏍᏗᏱᏦᏅᏍᏗ |
| S/he or it not to go | Verb: Infinitive - To do it | gesdiyuwenvsdi | ge sdi yu we nv sdi | ᎨᏍᏗᏳᏪᏅᏍᏗ |
| They not to go | Verb: Infinitive - To do it | gesdiyunenvsdi | ge sdi yu ne nv sdi | ᎨᏍᏗᏳᏁᏅᏍᏗ |

Construct all Who to Whom Words

Figure 12A:
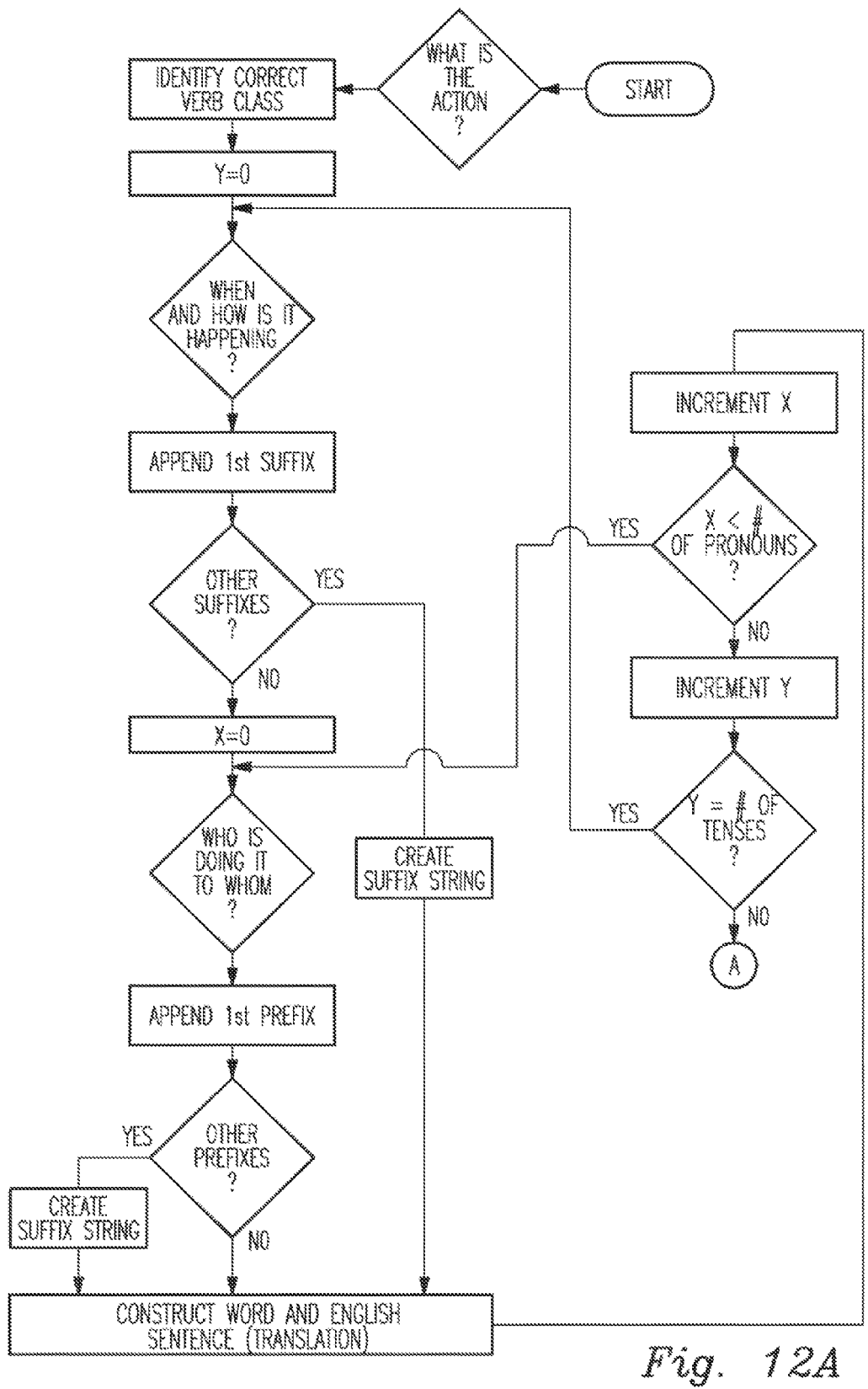
FIGS. 12A and 12B together are a flowchart representing an algorithm or program which generates all the WHO TO WHOM forms for any one root word in a known polysynthetic language for which a parsing reference database already exists.
Figure 12B:
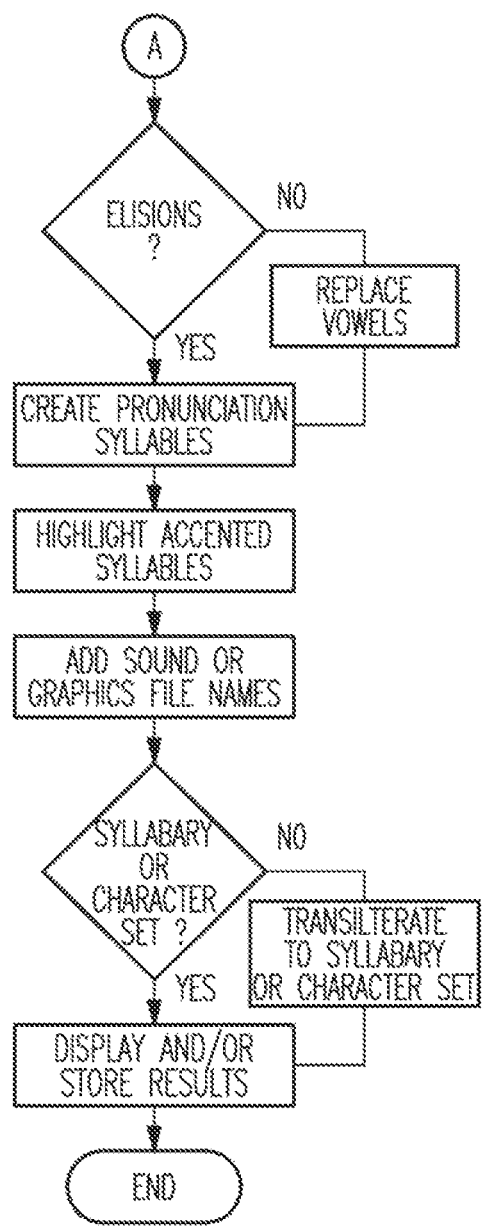

FIGS. 12A and 12B together are a flowchart representing a program which generates all the WHO TO WHOM forms for any one root word in a known polysynthetic language where the Grandmother Chart already exists.

Unlike English, in which a sentence has a subject-verb-object (for example, I am hitting him), the polysynthetic languages use a different WHO component for each of the WHO To WHOM relationships. (For example, tsiyvniha, I am hitting him or gvyvniha, I am hitting you (1 person). The WHAT, HOW and WHEN components remain the same.)

As the program executes, the output is a list of words, with their English equivalents, pronunciation syllables, syllabary or character set representation of the words, and a list of sound files for each of the syllables, so the user can hear them pronounced. The length of the list is equal to the number of pronouns used in the language times the number of tenses used in the language.

In the specific example of FIGS. 12A and 12B, all the instructions are coded into the program itself. The invention may alternatively be embodied in a program which accesses a database containing the appropriate letters or syllables for each individual portion and combines them into the polysynthetic word.

Following are the charts generated:

WHO TO WHOM CHART - © 2012 Flying Lizard Languages LLC

| WHO'S DOING IT | WHOM THEY'RE DOING IT TO | to me | to you & me | to all of you and me | to her/him & me | to them & me | to you | to you2 | to you3+ | to him or her | to it | to them (alive) | to them (not alive) |
|---|---|---|---|---|---|---|---|---|---|---|---|---|---|
| I | g- | | | | | | gv- | stv- | itsv- | tsi-eni-edi- | tsi-ini-idi- | gatsi-geni-geti- | detsi-deni-deti- |
| You and I | in- | | | | | | | | | | | | |
| All of you and I | id- | | | | | | | | | | | | |
| S/he and I | ost- | | | | | | stv-itsv- | stv-itsv- | itsv-itsv- | osti-otsi- | osti-otsi- | dosti-dotsi- | dosti-dotsi- |
| They and I | ots- | | | | | | | | | | | | |
| You (1) | h- | sgi- | | sgini- | sgi- | | | | | hi-sti- | hi-sti- | gehi-desti- | dehi-desti- |
| You (2) | ist- | sgini- | | sgini- | sgi- | | | | | | | | |
| You (3+) | its- | sgi- | | sgo- | sgi- | | | | | itsi- | itsi- | detsi- | detsi- |
| He/she/it | a-verb | agi-agw- | gini-gin- | igi-ig- | ogini-ogin- | ogi-og- | tsa-ts- | sti-st- | itsi-its- | u- (w) ga-* | u(w)-ga-* | uni-un- | uni-un- |
| They (alive) | an- | gvgi-gvg- | gegini-gegin- | gegi-geg- | gogini-gogin- | gogi-gog- | getsa-gets- | gesti-gest- | getsi-gets- | gvwa-gvw- | ani-an- | gvwani-gvwan- | dani-dan- |
| They (not alive) | an- | vgi- | egini- | egi- | ogini- | ogi- | etsa- | esti- | etsi- | atsi | atsi- | getsi- | getsi- | u(w) = being done to him/her/it
ga = S/he's doing it to him/her

| WHO CHART - © Flying Lizard Languages LLC | | | | |
|---|---|---|---|---|
| WHO<br>all the possibilities | | | | |
| | | ROW 9 of WHO TO WHOM CHART | COLUMN 10 of WHO TO WHOM CHART | ALL OF WHO TO WHOM CHART |
| WHO | active | being done to | doing to it implied in word, like speak | words that mean action from one person to others |
| I | g- | agi- or agw- | tsi- | 85 possibilities |
| you and I | in- | gini- | ini- | |
| you all and I | id- | igi- | idi- | |
| S/he and I | ost- | ogini- | osti- | |
| They and I | ots- | og- | otsi- | |
| You (1) | h- | tsa- | hi- | |
| You (2) | ist- | sti- | sti- | |
| You (3+) | its- | itsi- | itsi- | |
| S/he or it | — | u- or uw- | ga- | |
| They | an- | un- | ani- | |

Re-Creating "Lost" Words

As discussed above, the parsing reference database can be used to transform individual text strings back into correctly formed polysynthetic words. In addition, the parsing reference database can be used to infer and create the correct text strings for all the positions of a word when only a single, incomplete exemplar is available for that word. Many native speakers know only the versions of words they heard their grandparents use, and that usage often dropped syllables, either from the ends of words or elsewhere. (like droppin' your g's in English, or makin' contractions).

Accordingly, and because embodiments of the invention reveal the pattern of polysynthetic words, old Cherokee words that are not in dictionaries have been recreated. In cases where only a couple of words are available as samples, the Verb Clans can be referenced to generate all the forms of the words. In other words, embodiments of the invention allow the creation (or re-creation) of the fowls of "lost" words, as well as the ability to replace missing syllables in known words.

As an example, two fluent Cherokee speakers were asked how to say, "I have a dog," expecting them to reply "Gili agikaha" (Dog I-have-the-living-thing). Instead they replied, Gili tsinasa'a, explaining that you would say this if you had something alive that was working for you, like a dog or a horse, hunting or plowing. If you had a bird or a child, you would say Tsiskwa agikaha, or Ayotli agikaha.

Insofar as the inventors are aware, the word tsinasa'a is not in any of the dictionaries or dissertations on Cherokee language. (However, ganasa=tame (adjective) is in at least one dictionary.) However, using its ending in Verb Clans, by processing those patterns can be employed to make all the tenses of the word, i.e. the twelve common tenses in Cherokee.

More particularly, software employing or referencing the parsing reference database, by identifying the specific cluster (verb clan) that matches all the available positions and by providing all the text strings for the full form of the word, also provides the correct text string for the missing portion(s). The Construct One Word, Construct All Words, Construct All Who to Whom Words algorithms or programs disclosed herein are employed to create (or re-create) all one hundred twenty forms in the positive for each word root, plus one hundred twenty forms in the negative.

The process is not simple, as the verb clans and grandmother chart are required to keep straight all the individual permutations in the conjugations, but can be implemented in computer software.

An example is represented in the EMPLOY matrix on the following page. From the matrix one can take each row, for example, I have it/employ it, and make ten more sentences using that pattern with all ten possible persons. Thus, by hearing one form of the word from a fluent speaker, confirmed by another speaker, one hundred twenty forms of the word can be predicted, twelve tenses times ten persons.

| | | | | | matrix<br>EMPLOY | | |
|---|---|---|---|---|---|---|---|
| prefix | WHO | WHAT | HOW | WHEN | English | word in syllables | |
| | tsi | nasa | ' | a | I have, I employ* | tsi na sa a | present |
| | tsi | nasa | ' | ' | I just did, just about to have, employ | tsi na sa | immediately/command |
| | tsi | nasa | sg | o'i | I have, I employ | tsi na sa sgo i | continually |
| | ga | nasa | sg | i | employer<br>I will be having, | ga na sa sgi | the one who does it |
| | tsi | nasa | sg | esdi | employing | tsi na sa sge sdi | continually future |
| | tsi | nasa | sg | v'i | I was having, employing<br>I was having, employing | tsi na sa sgv i | continually past |
| | tsi | nasa | sg | v gi | definitely<br>I was having, employing, | tsi na sa sgv gi | continually past definitely |
| | tsi | nasa | sg | e'i | they say | tsi na sa sge i | continually past so they say |
| da | tsi | nasa | ' | i | I will have, employ | da tsi na sa i | one point in time future |
| | agi | nasa | ' | v'i | I had, employed | a gi na sa v i | one point in time past |
| | agi | nasa | ' | vgi | I had, employed definitely | a gi na sa v gi | one point in time past definitely |
| | agi | nasa | ' | e'i | I had, employed they say | a gi na sa e i | one point in time past so they say |
| | agi | nasa | s | di | I to have, employ | a sgi na sa sdi | possible future |
| bonus word | ga | nasa | s | di | it to be employed = EMPLOYEE? TOOL?<br>* like a dog or horse | ga na sa sdi<br>common usage:<br>Jerry Wolf tsi na sa a =<br>June Stamper Smith = tsi na sa a, tsi na sa i. | the thing to do it<br>I have a dog<br>I have a dog, horse something that works for me<br>I have a bird, a child = agikaha, uwakaha |

Another example, available dictionaries, grammars, and dissertations list "agwatseli" as "mine," an adjective. For example, agwatseli dagwalelu=my car. This word can be made into ten persons: ginatseli=mine—you (one person) and I. Igatseli=you all and I, it is ours, etc. However, based on an old word that had the full form: agwatseliga=it is being mine, an embodiment of the invention employing Verb Clans predicted all twelve tenses: It was just mine/is just about to be mine; It is mine (habitually); It will be being mine; It was being mine; it was being mine definitely; it was being mine, they say; It will be mine; It was mine; It was mine definitely; It was mine they say; It to be mine Each of these twelve tenses can be made with all ten people. An example is on the following page.

finding exemplars of polysynthetic words of the target polysynthetic language expressed in a selected system of orthography;

providing as input to a deconstructor, as exemplars, a plurality of words in the polysynthetic language where WHO is doing an action is known in the user language;

employing the deconstructor to determine a character string common to the plurality of polysynthetic words as a likely character string in the target polysynthetic language for the known WHO in the user language, and storing the character string in the target polysynthetic language with the user language equivalent as a pair in the WHO part of the parsing reference database;

MINE

| prefix | WHO | WHAT | HOW | WHEN | English | word in syllables | |
|--------|-----|------|-----|------|---------|-------------------|---|
| | agw | atseli | g | a | I possess it | a gwa tse li ga | present |
| | agw | atseli | g | i | I just possessed it, just about to | a gwa tse li gi | immediately/command |
| | agw | atseli | g | o'i | I possess it (habitually) | a gwa tse li go'i | continually |
| | | atseli | g | i | the owner? | atseli'i | the one who does it |
| | agw | atseli | g | esdi | I will be possessing it | a gwa tse li ge sdi | continually future |
| | agw | atseli | g | v'i | I was possessing it | a gwa tse li gv'i | continually past |
| | agw | atseli | g | v gi | I was possessing it, definitely | a gwa tse li gv gi | continually past definitely |
| | agw | atseli | | e'i | I was possessing it, they say | a gwa tse li ge'i | continually past so they say |
| da | agw | atseli | ts | i | I will possess it | da gwa tse li tsi | one point in time future |
| | agw | atseli | ts | v'i | I possessed it | a gwa tse li tsv i | one point in time past |
| | agw | atseli | ts | vgi | I possessed it, definitely | a gwa tse li tsv gi | one point in time past definitely |
| | agw | atseli | ts | e'i | I possessed it, they say | a gwa tse li tse i | one point in time past so they say |
| | agw | atseli | s | di | I to possess it | a gwa tse li sdi | possible future |
| bonus word | | | | | | | one word in NJS interview, 1885 shortened form is used as an adjective-- agwatseli |

Figure 13:
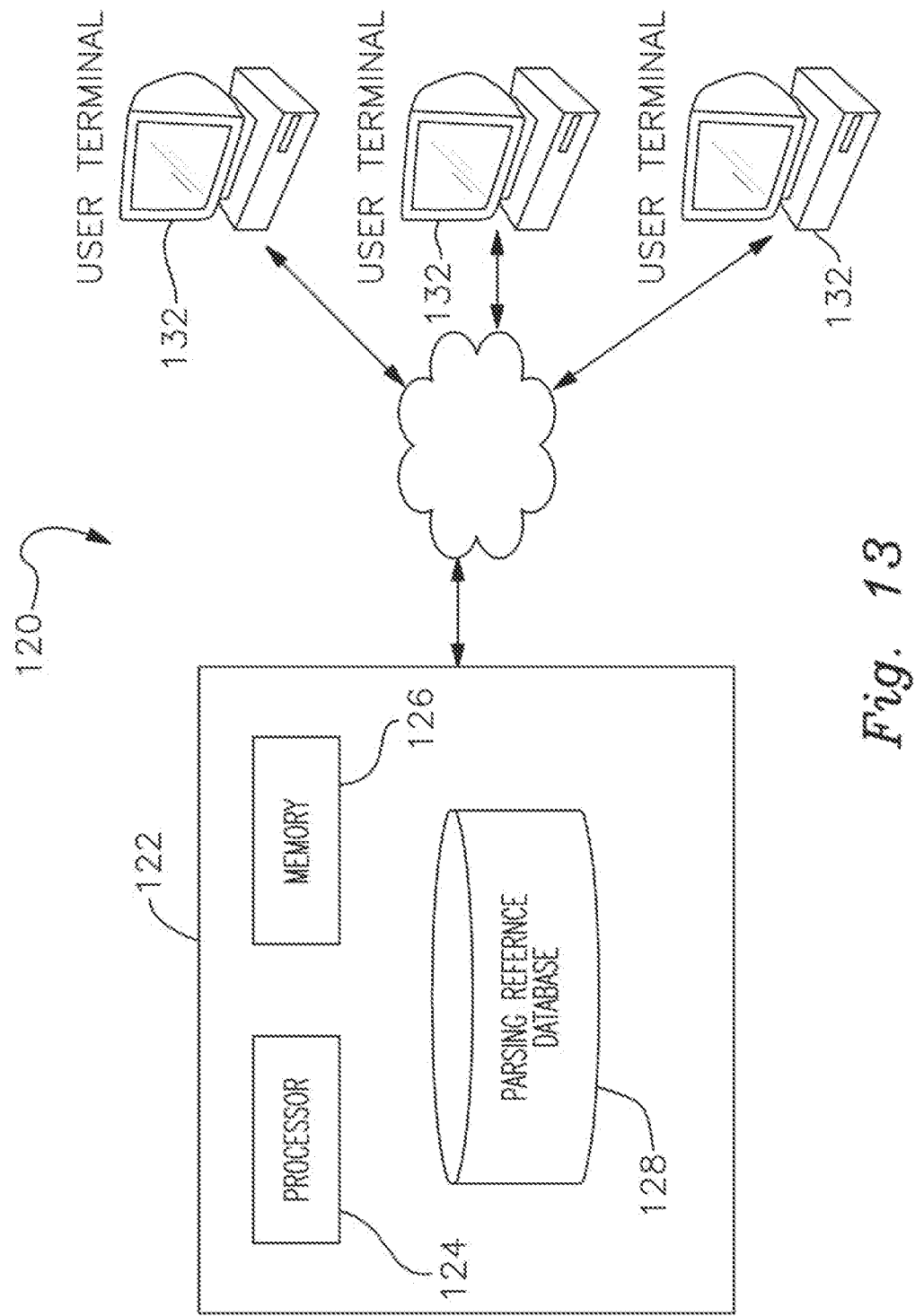
FIG. 13 represents an exemplary computing environment embodying the invention wherein the processes and methods described herein are implemented.

Finally, FIG. 13 represents an exemplary computing environment 120 embodying the invention wherein the processes and methods described herein are implemented. The computing environment 120 includes a computer server 122 including a processor 124 and memory 126 running server-side software referencing a language parsing reference database 128. The computer server 122 establishes an internet website and is operable as described hereinabove. The computer server 122 is connected to the internet, represented at 130, and is accessible via the internet 130 by a plurality of users employing user terminals 132 in the form of personal computers.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. For facilitating subsequent translation of words in a target polysynthetic language to or from a user language, a method of generating a language parsing reference database, assisted by a computer having a processor, said method comprising:

organizing the parsing reference database to include polysynthetic word parts WHO, WHAT, HOW and WHEN;

identifying, in the target polysynthetic language, categories of WHEN an action is happening;

for each of the categories of WHEN,
  finding, as exemplars, a plurality of words in the polysynthetic language,
  providing, as input to the deconstructor, the plurality of words in the polysynthetic language along with respective equivalents in the user language, and
  employing the deconstructor to determine a character string common to the plurality of polysynthetic words as a likely character string in the target polysynthetic language for the particular category of WHEN, and storing the character string in the target polysynthetic language with the user language equivalent as a pair in the WHEN part of the parsing reference database;

identifying, in the target polysynthetic language, category sets of HOW an action is happening combined with WHEN the action is happening as WHEN/HOW category sets;

for each WHEN/HOW category set,
  finding, as exemplars, a plurality of words in the polysynthetic language,
  providing, as input to the deconstructor, the plurality of words in the polysynthetic language along with respective equivalents in the user language, and
  employing the deconstructor to determine a character string common to the plurality of polysynthetic words as a likely character string in the target polysynthetic language for the particular WHEN/HOW category set, presenting to a user for confirmation, storing the character string in the target polysynthetic language with the user language equivalent as a paired sequence, and then subtracting the previously-identified WHEN for the category to determine HOW for that category of WHEN/HOW, and storing in the parsing reference database; and determining additional components in the target polysynthetic language other than a WHAT action is being done component, removing those additional components from a polysynthetic word to find WHAT action is being done, and then storing the resultant character string with its user language equivalent as a pair in the parsing reference database.

2. The method of claim 1, wherein said steps of employing the deconstructor further comprise, after determining a character string common to the plurality of polysynthetic words as a likely character string in the target polysynthetic language, presenting the character string to a user for confirmation.

3. A system including a computer processor for grouping or clustering all words in a target polysynthetic language having the same text strings in the WHO, HOW and WHEN, said system comprising:

a comparator which references a language parsing reference database, either by instructions coded into a computer program or by access to a separate database, the parsing database organized to include polysynthetic words parts WHO is doing an action, WHAT action is being performed, HOW an action is happening, and WHEN an action is happening in the polysynthetic language;

said comparator operable to sort the contents of the language parsing reference database into like groups, each group containing polysynthetic words having exactly the same text strings for WHO, HOW and WHEN, and to provide an output of these groups showing the Verb Clans conjugation patterns of the target polysynthetic language;

the Verb Clans conjugation patterns being stored in a database, or coded into a computer program, or displayed visually as a chart;

a parser which references the Verb Clans conjugation patterns, either by instructions coded into a computer program or by access to a separate database;

said parser operable to match a polysynthetic word to its corresponding Verb Clan conjugation pattern thereby providing the correct text strings for constructing every form for each of the WHO is doing the action for each of the HOW/WHEN the action is being done combinations.

* * * * *